US012578763B2

(12) United States Patent
Emmert

(10) Patent No.: US 12,578,763 B2
(45) Date of Patent: Mar. 17, 2026

(54) DEFORMABLE ELECTRONIC DEVICES AND METHODS FOR CONSTRUCTING THE SAME

(71) Applicant: Motorola Mobility LLC, Chicago, IL (US)

(72) Inventor: Steve C Emmert, McHenry, IL (US)

(73) Assignee: Motorola Mobility LLC, Chicago, IL (US)

( * ) Notice: Subject to any disclaimer, the term of this patent is extended or adjusted under 35 U.S.C. 154(b) by 304 days.

(21) Appl. No.: 18/213,679

(22) Filed: Jun. 23, 2023

(65) Prior Publication Data

US 2024/0427377 A1 Dec. 26, 2024

(51) Int. Cl.
*G06F 1/16* (2006.01)
*H04M 1/02* (2006.01)

(52) U.S. Cl.
CPC .......... *G06F 1/1652* (2013.01); *G06F 1/1635* (2013.01); *H04M 1/0262* (2013.01); *H04M 1/0268* (2013.01)

(58) Field of Classification Search
CPC .... G06F 1/1652; G06F 1/1635; G06F 1/1616; G06F 1/1618; G06F 1/1681; H04M 1/0262; H04M 1/0268
See application file for complete search history.

(56) References Cited

U.S. PATENT DOCUMENTS

| | | | |
|---|---|---|---|
| 5,340,072 A | 8/1994 | Halbert | |
| 9,663,297 B1 | 5/2017 | Steinhoff et al. | |
| 9,918,396 B2 * | 3/2018 | Han | H05K 5/0217 |
| 10,310,565 B2 * | 6/2019 | Aoki | G06F 1/1652 |
| 11,522,985 B1 | 12/2022 | Lim et al. | |
| 2004/0155503 A1 | 8/2004 | Stumpf et al. | |
| 2010/0232100 A1 * | 9/2010 | Fukuma | H04M 1/0216 |
| | | | 361/679.01 |
| 2016/0370828 A1 * | 12/2016 | Hsu | G06F 1/1652 |
| 2016/0370829 A1 * | 12/2016 | Hsu | G06F 1/1681 |
| 2021/0059059 A1 * | 2/2021 | Pai | G06F 1/1681 |

* cited by examiner

*Primary Examiner* — Sagar Shrestha
(74) *Attorney, Agent, or Firm* — Philip H. Burrus, IV

(57) ABSTRACT

A deformable electronic device includes a flexible substrate supporting a plurality of pivot shafts each having its central axis aligned substantially parallel with a surface defined by the flexible substrate. A plurality of links interconnects the pivot shafts. Each link defines a pivoting aperture within which a pivot shaft can rotate without translation and a sliding aperture within which another pivot shaft can both rotate and translate. Each pivot shaft translates linearly from a first position within the sliding aperture to a second position within the sliding aperture that is different from the first position when the deformable electronic device deforms from a substantially planar state to a deformed state.

21 Claims, 23 Drawing Sheets

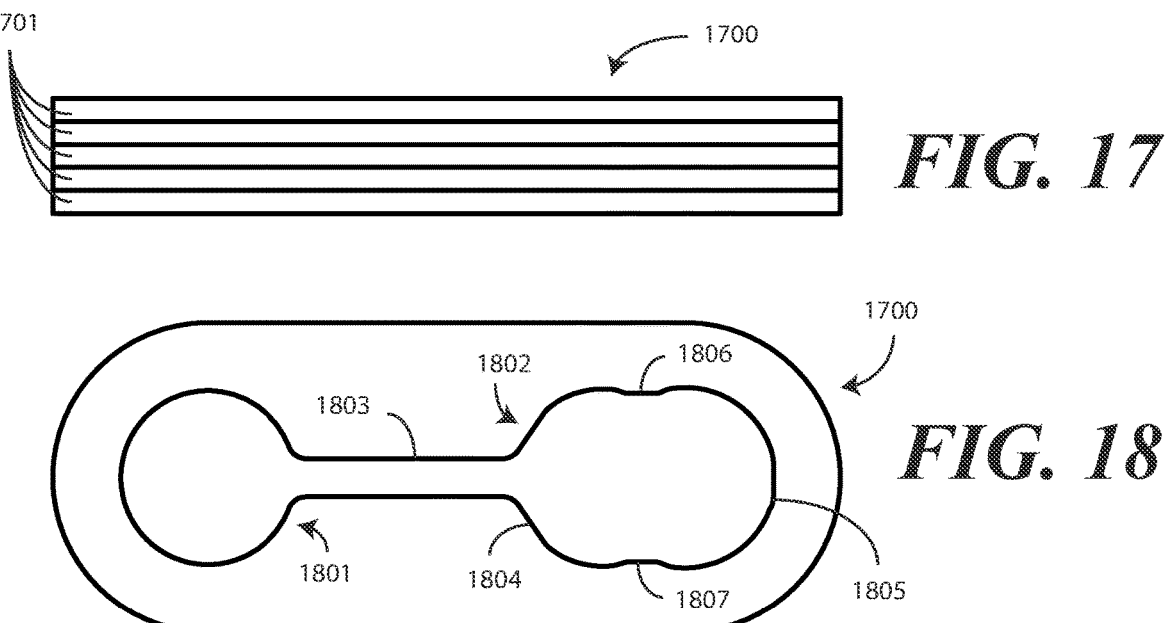
FIG. 17
FIG. 18
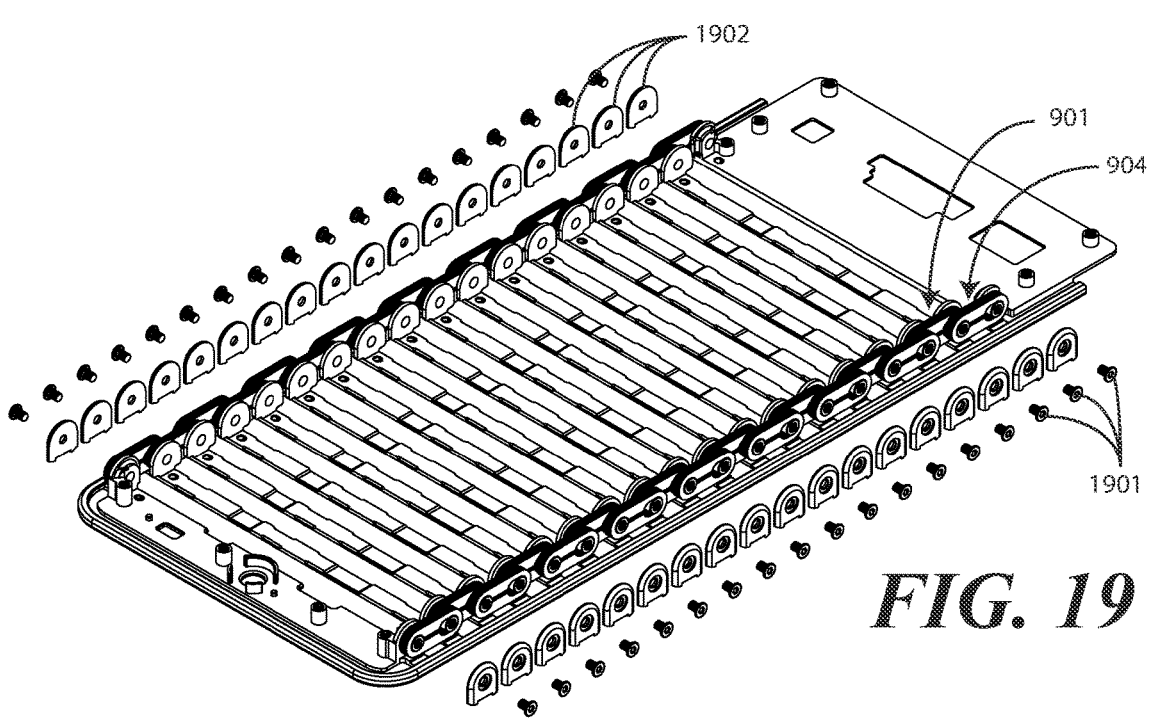
FIG. 19

2200

523

505

504

Translate and Pivot

Pivot

DEFORMABLE ELECTRONIC DEVICES AND METHODS FOR CONSTRUCTING THE SAME

BACKGROUND

Technical Field

This disclosure relates generally to electronic devices, and more particularly to electronic devices operable with content presentation companion device having deformable displays.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. Since the displays of some deformable devices can deform as well, thereby changing the geometric configuration of the display, it would be advantageous to have an improved electronic device and corresponding methods that allow the user to interact with visible areas of the display in a seamless manner.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 17 illustrates a top plan view of one explanatory link in accordance with one or more embodiments of the disclosure.

FIG. 18 illustrates a side elevation view of one explanatory link in accordance with one or more embodiments of the disclosure.

FIG. 19 illustrates an exploded view of a third partial deformable electronic device assembly in accordance with one or more embodiments of the disclosure.

FIG. 37 illustrates yet another deformable electronic device in accordance with one or more embodiments of the disclosure when that deformable electronic device is in a substantially planar state.

FIG. 38 illustrates a side view of the deformable electronic device of FIG. 37.

Figure 1:
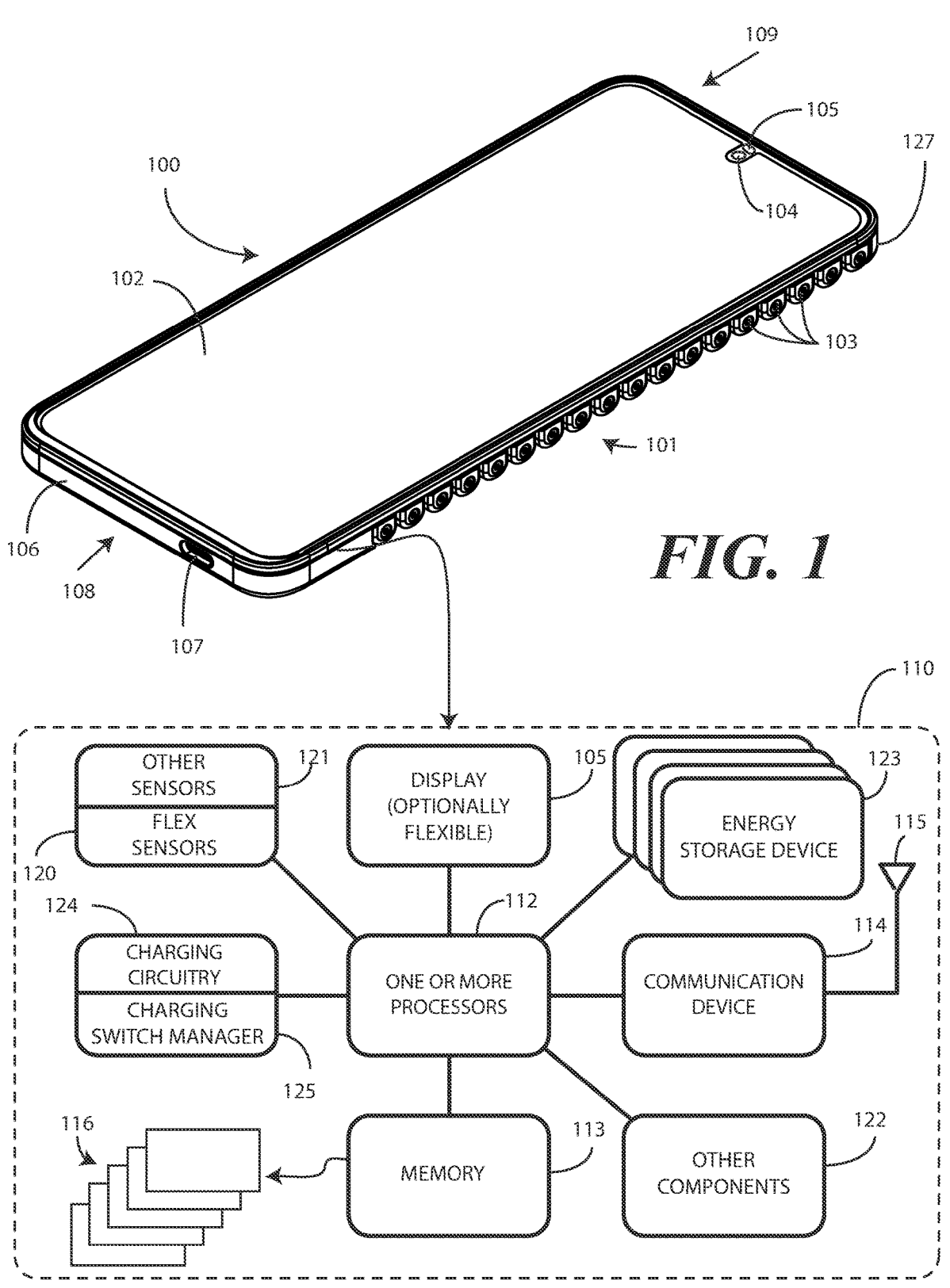
FIG. 1 illustrates one explanatory deformable content presentation companion device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to a deformable electronic device and methods for constructing the same. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a deformable electronic device that includes a flexible substrate. In one or more embodiments, the flexible substrate supports a plurality of pivot shafts each having its central axis aligned substantially parallel with a surface defined by the flexible substrate.

In one or more embodiments, a plurality of links interconnects the plurality of pivot shafts. In one or more embodiments, each link of the plurality of links includes a pivoting aperture within which a pivot shaft of the plurality of pivot shafts can rotate without translation. In one or more embodiments, each link of the plurality of links also includes a sliding aperture within which another pivot shaft of the plurality of pivot shafts can both rotate and translate.

In one or more embodiments, each pivot shaft of the plurality of pivot shafts engages both the pivoting aperture of a first link of the plurality of pivot shafts and the sliding aperture of a second link of the plurality of pivot shafts. When the deformable electronic device deforms from a substantially planar state to a deformed state, each pivot shaft of the plurality of pivot shafts translates linearly from a first position within the sliding aperture of the link it engages to a second position within the sliding aperture that is different from the first position.

In one or more embodiments, the sliding aperture of each link defines a curvilinear slot within which each pivot shaft can both rotate and translate when the deformable electronic device deforms. In one or more embodiments, this curvilinear slot defines two partially circular edge portions separated by a protuberance. The protuberance provides a mechanical interference that the pivot shaft must overcome when translating in the sliding aperture. The protuberance thus works to retain the pivot shaft in either the first position of the sliding aperture or the second position of the sliding aperture. Said differently, in one or more embodiments the partially circular edge portion retains the pivot shaft in either the first position or the second position until a lateral force sufficient to cause the pivot shaft to traverse the protuberance is applied to the pivot shaft toward the other of the first position or the second position.

In one or more embodiments, each link of the plurality of links also defines a compression slot causing the pivoting aperture to apply a loading force against the pivot shaft engaging that pivoting aperture. This loading force increases friction between the pivoting aperture and the pivot shaft engaging the pivoting aperture.

In one or more embodiments, each link of the plurality of links comprises a laminate of a plurality of link layers. Illustrating by example, in one or more embodiments each link comprises a laminate of five link layers, although more or fewer links can be used in other embodiments.

In one or more embodiments, each pivot shaft is supported by a corresponding stanchion extending distally from the flexible substrate. Illustrating by example, a bracket supporting two stanchions at each end can be coupled to the flexible substrate such that each stanchion extends distally away from a major surface of the flexible substrate to which the bracket is coupled.

In one or more embodiments, the links of the plurality of links are interleaved in an overlapping arrangement. Illustrating by example, in one or more embodiments odd instances of each pivot shaft of the plurality of pivot shafts engage the pivoting aperture of a link of the plurality of links while even instances of each pivot shaft of the plurality of pivot shafts engage the sliding aperture of another link of the plurality of links. Where the inner link of this overlapping, interleaved arrangement defines the pivoting aperture engaging the pivot shaft, the pivot shaft engages the pivoting aperture of the link before engaging the sliding aperture of another link of the plurality of links as the pivot shaft extends distally from its corresponding stanchion. Similarly, an adjacent pivot shaft would engage the sliding aperture of that link before engaging the sliding aperture as it extends distally from its corresponding stanchion.

In one or more embodiments, a plurality of screws—optionally through a fastener cap—engage a threaded bore in the pivot shaft to retain the links to the pivot shafts. It should be noted that while a plurality of screws are used in an explanatory embodiment, it will be obvious to those of ordinary skill in the art having the benefit of this disclosure that other fasteners can be used as well. Illustrating by example, a grooved shaft could couple to an e-clip retainer in another embodiment, and so forth.

A flexible display can then be positioned such that it abuts a major face of the flexible substrate on the opposite side of where the brackets supporting the stanchions supporting the pivot shafts are coupled. In one or more embodiments, one or more electronic circuit components can be coupled to the flexible substrate as well. In one or more embodiments, one or more rechargeable batteries can be positioned between pairs of stanchions and electrically coupled to the one or more electronic circuit components. A plurality of covers, with each cover of the plurality of covers covering the one or more rechargeable batteries situated between the pairs of stanchions can be placed atop the rechargeable batteries without touching neighboring covers when the deformable electronic device is in the substantially planar state.

Since the deformable electronic device can change form factors dynamically while in operation, embodiments of the disclosure contemplate that the visible area of the flexible display available to a user can change while content is actively, and dynamically, being presented. Illustrating by example, if the deformable electronic device is flat, the entire area of the flexible display may be visible. By contrast, if the deformable electronic device is folded in half, only half of the available area of the flexible display will be visible, and so forth.

One or more processors of the one or more electronic circuit components can dynamically adjusting the content presentation on the deformable electronic device as a function of the geometric configuration of that deformable electronic device. Thus, if a user is watching a television show when the deformable electronic device is flat, thereby using all of the flexible display of the deformable electronic device, and then bends the deformable electronic device in a loop to wear it around a wrist, embodiments of the disclosure can dynamically and seamlessly, cause the television show to morph to adjust the visible area available on the deformable electronic device after the deformable electronic device is deformed.

Turning now to FIG. 1, illustrated therein is one explanatory deformable electronic device 100 configured in accordance with one or more embodiments of the disclosure. The deformable electronic device 100 of FIG. 1 is a portable electronic device. In one or more embodiments, the deformable electronic device 100 includes a deformable link assembly 101 that includes one or more pivot members 103 that allow the deformable electronic device 100 to be selectively deformed by bending or folding. Advantageously, this allows the deformable electronic device 100 to function as an equivalent to multiple devices depending upon the amount of deformation of the deformable link assembly 101.

For example, the deformable electronic device 100 is shown in an unbent configuration in which the deformable electronic device 100 is substantially planar in FIG. 1. In such a configuration, the deformable electronic device 100 can function as a smartphone, palm-top computer, or tablet computer. However, as will be shown below with reference to FIG. 3, in another embodiment the deformable electronic device 100 can be folded and can accordingly function as a table clock, content viewer, or auxiliary display when in a bent condition. It should be obvious to those of ordinary skill in the art having the benefit of this disclosure that the deformable electronic device 100 can function as other devices as a function of its physical geometry, including as a gaming device, a media player, or other device.

This illustrative deformable electronic device 100 includes a display 102, which may optionally be touch-sensitive. In one embodiment where the display 102 is touch-sensitive, the display 102 can serve as a primary user interface of the deformable electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 102 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 102 may be formed from multiple layers of flexible material such as flexible sheets of polymer or other materials.

The explanatory deformable electronic device 100 of FIG. 1 also includes a deformable link assembly 101 that includes one or more pivot members 103. The pivot members 103, which each include a pivot shaft having its central axis aligned substantially parallel with the surface defined by the display 102, and which each engage a plurality of links that are interleaved in an overlapping arrangement, allow portions of the deformable link assembly 101 to pivot about each linkage member so that the deformable electronic device 100 becomes bendable and/or foldable.

As will be shown in more detail below with reference to FIGS. 29-32, in one or more embodiments odd instances of each pivot member 103 has a pivot shaft engaging a pivoting aperture defined by a link of a plurality of links. Additionally, even instances of each pivot member 103 have a pivot shaft engaging a sliding aperture of another link. These links are interleaved in an overlapping arrangement with an inner group of links each defining a pivoting aperture within which the pivot shaft of each pivot member 103 may rotate and a sliding aperture within which another pivot shaft of another pivot member 103 can both rotate and translate laterally on its corresponding pivot shaft and an outer group of links each defining another pivoting aperture within which each engaging pivot shaft may rotate an another sliding aperture within which each engaging pivot shaft may rotate and translate laterally. Each pivot shaft engages an inner link of the inner group of links and an outer group of an outer group of links with each pivot shaft engaging one pivoting aperture of one link and one sliding aperture of one other link. Where the inner link of this overlapping, interleaved arrangement defines the pivoting aperture engaging the pivot shaft, the pivot shaft engages the pivoting aperture of the link before engaging the sliding aperture of another link of the plurality of links as the pivot shaft extends distally from its corresponding stanchion. Similarly, an adjacent pivot shaft would engage the sliding aperture of that link before engaging the sliding aperture as it extends distally from its corresponding stanchion. When the deformable electronic device 100 is deformed, each pivot shaft translates within its corresponding sliding aperture and pivots within its corresponding pivoting aperture, thereby allowing the deformable electronic device 100 to be deformed into the deformed states of FIGS. 2-4 in addition to numerous others, some examples of which are shown below with reference to FIGS. 33-34 and others that will be obvious to those of ordinary skill in the art having the benefit of this disclosure.

In one or more embodiments, a flexible substrate, examples of which are shown below in FIGS. 6-7. provides intermediary support structure between the display 102 and the deformable link assembly 101. In the illustrative embodiment of FIG. 1, the display 102 abuts a major surface of the flexible substrate on an opposite side of the flexible substrate relative to the deformable link assembly 101. In one embodiment, the lower surface of the display 102, or another layer in the mechanical stack-up of the display 102, can be adhered to the flexible substrate on one side of the flexible substrate while the deformable link assembly 101, or alternatively to portions of the deformable link assembly 101, are adhered to the other side of the flexible substrate. In this illustrative embodiment, the display 102 also spans the pivot members 103. In this illustrative embodiment, the display 102 is flexible so as to deform when the deformable link assembly 101 bends around the pivot members 103.

Features can be incorporated into the deformable electronic device 100. Examples of such features include an optional image capture device 104 or an optional speaker port 105. A user interface component, which may be a button or touch sensitive surface, can also be disposed along a side of an electronic circuit component housing 106. The deformable electronic device 100 can also include one or more connectors 107, which can be an analog connector, a digital connector, or combinations thereof.

A block diagram schematic 110 of the deformable electronic device 100 is also shown in FIG. 1. The block diagram schematic 110 can be configured as a printed circuit board assembly disposed within the electronic circuit component housing 106. Various components can be electrically coupled together by conductors, or a bus disposed along one or more printed circuit boards. A flexible substrate can then span the pivot members 103 to electrically couple electronic circuits situated in the electronic circuit component housing 106 to other components situated within another electronic circuit component housing 127, wherein included, together.

In one or more embodiments, the deformable electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the deformable electronic device 100. Each of the application processor and the auxiliary processor(s) can be configured to process and execute executable software code to perform the various functions of the deformable electronic device 100. A storage device, such as memory 113, can optionally store the executable software code used by the one or more processors 112 during operation.

In this illustrative embodiment, the deformable electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the deformable electronic device 100. For example, in one embodiment the one or more processors 112 comprise one or more circuits operable with one or more user interface devices, which can include the display 102, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the deformable electronic device 100. The operating system environment can include a kernel and one or more drivers, and an application service layer, and an application layer. The operating system environment can be configured as executable code operating on one or more processors or control circuits of the deformable electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figures 2, 3, 4:
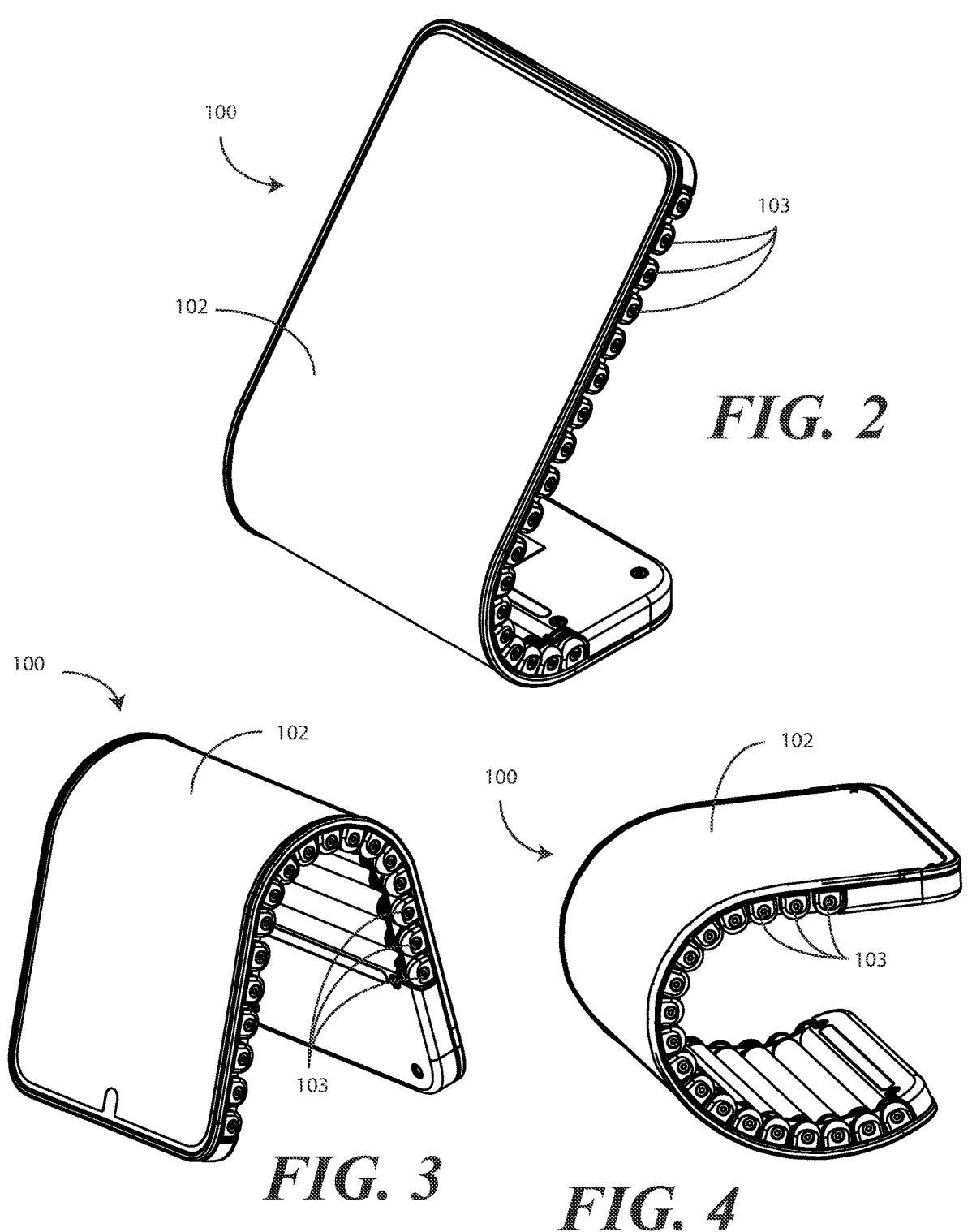
FIG. 2 illustrates one explanatory deformable content presentation companion device in accordance with one or more embodiments of the disclosure when in a deformed "stand" configuration.
FIG. 3 illustrates the explanatory deformable content presentation companion device of FIG. 1 when in a deformed "tent" configuration.
FIG. 4 illustrates the explanatory deformable content presentation companion device of FIG. 1 when deformed in a "wrapped" configuration.

In one embodiment, the deformable electronic device 100 optionally includes one or more flex sensors 120, operable with the one or more processors 112, to detect a bending operation that causes the deformable link assembly 101 to deform, thereby transforming the deformable electronic device 100 into a deformed geometry, such as that shown in FIG. 2. The inclusion of flex sensors 120 is optional, and in some embodiment flex sensors 120 will not be included. Where flex sensors 120 are not included and device operation is a function of the amount of deformation of the deformable link assembly 101, the user can alert the one or more processors 112 to the fact that the one or more bends are present through the user interface or by other techniques. In one embodiment, the flex sensors 120 comprise passive resistive devices manufactured from a material with an impedance that changes when the material is bent, deformed, or flexed. Other types of flex sensors 120 will be obvious to those of ordinary skill in the art having the benefit of this disclosure.

In one embodiment, the one or more processors 112 may generate commands or execute control operations based on information received from the various sensors, including the one or more flex sensors 120, the user interface, or the other sensors 121. The one or more processors 112 may also generate commands or execute control operations based upon information received from a combination of the one or more flex sensors 120, the user interface, or the other sensors 121. Alternatively, the one or more processors 112 can generate commands or execute control operations based upon information received from the one or more flex sensors 120 or the user interface alone. Moreover, the one or more processors 112 may process the received information alone or in combination with other data, such as the information stored in the memory 113.

The one or more other sensors 121 may include a microphone, an earpiece speaker, a second loudspeaker, and a user interface component such as a button or touch-sensitive surface. The one or more other sensors 121 may include one or more of an accelerometer, gyroscope, image capture device, and/or display touch sensors to determine whether the deformable electronic device 100 is being held on the base side or flip side in a portrait mode.

The one or more other sensors 121 may also include key selection sensors, proximity sensors, a touch pad sensor, a touch screen sensor, a capacitive touch sensor, and one or more switches. Touch sensors may be used to indicate whether any of the user actuation targets present on the display 102 are being actuated. Alternatively, touch sensors disposed in the deformable electronic device 100 can be used to determine whether the deformable electronic device 100 is being touched at side edges or major faces of the deformable link assembly 101. The touch sensors can include surface and/or housing capacitive sensors in one embodiment. The other sensors 121 can also include audio sensors and video sensors (such as a camera).

The other sensors 121 can also include motion detectors, such as one or more accelerometers or gyroscopes. For example, an accelerometer may be embedded in the electronic circuitry of the deformable electronic device 100 to show vertical orientation, constant tilt and/or whether the deformable electronic device 100 is stationary. A gyroscope can be used in a similar fashion.

Other components 122 operable with the one or more processors 112 can include output components such as video outputs, audio outputs, and/or mechanical outputs. Examples of output components include audio outputs such as speaker port 105, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the deformable electronic device 100 comprises a plurality of energy storage devices 123. In one or more embodiments, as will be explained in more detail below with reference to FIG. 23, the plurality of energy storage devices 123 include a pair of energy storage devices situated in each pivot member 103. In one or more embodiments, each pair of energy storage devices of the plurality of energy storage devices 123 situates in a corresponding pivot member 103 on a one-to-one basis, with a pair of energy storge devices 123 situated within a corresponding pivot member. In other embodiments, a single energy storage device of the plurality of energy storage devices 123 situates in a corresponding pivot member 103 on a one-to-one basis.

In the illustrative embodiment of FIG. 1, the plurality of energy storage devices 123 are situated on a rear side of the flexible substrate supporting the display 102. In this example, the plurality of energy storage devices 123 are situated between the electronic circuit component housing 106 to other components situated within another electronic circuit component housing 127. In one or more embodiments, each pair of energy storage devices of the plurality of energy storage devices 123 substantially spans a width of the deformable electronic device. This will be shown in more detail below with reference to FIG. 23.

Each energy storage device of the plurality of energy storage devices 123 can take a variety of forms. In an illustrative embodiment, each energy storage device of the plurality of energy storage devices 123 can comprise an electrochemical cell. For instance, the plurality of energy storage devices 123 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 123 may be a supercapacitor, and so forth.

In one or more embodiments, a first pair of energy storage devices is situated in a first pivot member, with a second pair of energy storages device situated in a second pivot member, and so forth. In one or more embodiments, an electrical conductor couples the energy storage devices of the plurality of energy storage devices 123 together and/or to the one or more processors 112.

Charging circuitry 124 can be included to selectively individual, subsets, or all of the plurality of energy storage devices 123 when depleted. In one or more embodiments, the charging circuitry 124 comprises a charging node that is coupled to each energy storage device of the plurality of energy storage devices 123.

In one or more embodiments, the charging circuitry 124 includes a switch 125 that is electrically coupled between the conductor coupling the plurality of energy storage devices 123. Opening the switch 125 disconnects the conductor from the plurality of energy storage devices 123, while closing the switch couples the plurality of energy storage devices 123 to the components of the block diagram schematic 110.

It is to be understood that FIG. 1 is provided for illustrative purposes only and for illustrating components of one deformable electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the deformable electronic device 100. For example, a user can apply force at the first end 108 and the second end 109 of the deformable electronic device 100 to pivot portions of the deformable link assembly 101 relative to other portions of the deformable link assembly 101. This method of deforming the deformable link assembly 101 allows the user to simply and quickly bend the deformable electronic device 100 into a desired shape.

In other embodiments, rather than relying upon the manual application of force, the deformable electronic device 100 can include a mechanical actuator to deform the deformable link assembly 101 around the pivot members 103. For example, a motor or other mechanical actuator can be operable with structural components to deform the deformable link assembly 101 around the pivot members 103 to predetermined angles or geometric alignments in one or more embodiments. The inclusion of a mechanical actuator allows a precise bend angle to be repeatedly achieved without the user having to make adjustments. However, as the inclusion of a mechanical actuator can increase cost, in other embodiments this component will be omitted.

It should be noted that in one or more embodiments, the display 102 has a compliance coefficient that can be used advantageously to help counter the bending operation. Illustrating by example, when the bending operation transforms the deformable electronic device 100 to a bent configuration, one example of which is shown below with reference to FIG. 3, in one or more embodiments the mechanical layers of the display 102 are loaded by the bending operation and work to bias portions of the deformable link assembly 101 back to the open position of FIG. 1. Moreover, in one or more embodiments a thin stainless-steel plate (approximately 0.04 millimeters in thickness) forms one layer of the display 102 and will increase the loading. This mechanical loading of the layers of the display 102 can be used to help the user transform the deformable electronic device 100 from folded or partially folded configurations to unfolded configurations in one or more embodiments. The modulus of the display 102 can range from 40-300 giga-Pascals in one or more embodiments.

Regardless of whether the bending operation is a manual one or is instead one performed by a mechanical actuator, it results in the display 102 being deformed by one or more bends about the linkage members. Turning briefly to FIGS. 2-4, illustrated therein are three illustrative results of bending operations.

In the illustrative embodiment of FIG. 2, the deformable electronic device 100 has been placed on a table or other flat surface, with the bending operation leaving the electronic device to resemble a card folded into a "tent fold" having a single bend. This bent configuration can make the display 102 easier for the user to view since they do not have to hold the deformable electronic device 100 in their hands.

As shown in FIG. 2, the display 102 is deformed about the pivot members 103 as portions of the deformable link assembly 101 are bent into a "stand" configuration. In this illustrative embodiment, the display 102 has a single bend about the pivot members 103. However, in other embodiments, the display 102 can be deformed with a plurality of bends about the pivot members 103. Other configurations will be obvious to those of ordinary skill in the art having the benefit of this disclosure.

In one embodiment, the one or more processors (112) of the deformable electronic device 100 are operable to detect that a bending operation is occurring by detecting a change in an impedance of the one or more flex sensors (120). The one or more processors (112) can detect this bending operation in other ways as well.

For example, the touch sensors can detect touch and pressure from the user. Alternatively, the proximity sensors can detect the first end (108) and the second end (109) of the deformable electronic device 100 getting closer together. Force sensors can detect an amount of force that the user is applying to the deformable link assembly 101 as well. The user can input information indicating that the deformable electronic device 100 has been bent using the display 102 or another user interface. Other techniques for detecting that the bending operation has occurred will be obvious to those of ordinary skill in the art having the benefit of this disclosure.

In one or more embodiments, the one or more processors (112) can partition the display 102 of the deformable electronic device 100 as another function of the geometric alignment of the deformable link assembly 101 resulting from the bending operation. For example, in this embodiment the display 102 has been partitioned into a first portion that is visible and a second portion (facing into the surface upon which the deformable electronic device 100 rests), with each portion being disposed on opposite sides of the stand bend. In one or more embodiments, the one or more processors (112) can detect a bend amount as well.

In one or more embodiments, the one or more processors (112) of the electronic device are operable to, when the display 102 is deformed by one or more bends, present a first image on a first portion of the display 102, while presenting a second image on a second portion of the display 102. If, for example, the deformable electronic device 100 were turned such that the first end 108 and the second end 109 were resting on the surface, the deformable electronic device 100 would resemble a tent with a first portion of the display 102 visible from a first side of the bend and a second portion of the display 102 visible from a second side of the bend. This is a "tent" configuration shown in FIG. 3.

Turning to FIG. 3, the deformable electronic device 100 has been bent further to resemble a playing card bent into a "tent" configuration. In one or more embodiments, the tent configuration, when the deformable electronic device 100 is placed on a surface, makes the display 102 easier to see from above. Turning to FIG. 4, in this example the deformable electronic device 100 is deformed into a "wrapped" configuration. When in the wrapped configuration, the deformable electronic device 100 can even be worn on a wrist.

In one or more embodiments, the pivot members 103 define a multi-link hinging mechanism for the deformable electronic device 100. In this illustrative embodiment, pivot members 103 are all similarly configured with links separating each pivot member from another. Each pivot member 103 comprises a pivot shaft. As will be shown in more detail below, the links engaging each pivot shaft can be configured with mechanical features that provide drive functions, resistance functions, stage stop functions, and other functions that alter the way that the deformable electronic device 100 deforms. Illustrating by example, each link can define a pivoting aperture within which each pivot shaft of the plurality of pivot shafts can rotate without translation and a sliding aperture within which each pivot shaft of the plurality of pivot shafts can both rotate and translate when the deformable electronic device 100 deforms.

Moreover, in one or more embodiments the sliding aperture of each link defines two partially circular edge portions separated by a protuberance. Each partially circular edge portion retains its corresponding pivot shaft therein until a lateral force sufficient to cause the pivot shaft to traverse the protuberance is applied to the pivot shaft toward a portion of the curvilinear slot unoccupied by the pivot shaft when the lateral force is initially applied. Each link can also define a compression slot causing the pivoting aperture to apply a loading force against its corresponding pivot shaft, thereby increasing friction between the pivoting aperture and the pivot shaft engaging the pivoting aperture.

In one or more embodiments, each pivot member 103 includes one or more energy storage devices situated therein. In one or more embodiments, each energy storage device comprises a rechargeable electrochemical cell. In one or more embodiments, the rechargeable electrochemical cells include a positive electrode (cathode), a negative electrode (anode), and a separator that prevents these two electrodes from touching. While a separator electrically separates the cathode and anode, the separator permits ions to pass through.

In one or more embodiments, a separator having a top and bottom is placed atop an electrode. Disposed on the top of the separator is a first layer of an electrochemically active material. For example, the first layer may be lithium or a lithium intercalation material if the rechargeable electrochemical cells are lithium ion or lithium polymer cells.

Disposed atop first layer is a current collecting layer. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collection layer is a second layer of electrochemically active material.

The rechargeable electrochemical cells store and deliver energy by transferring ions between electrodes through a separator. For example, during discharge, an electrochemical reaction occurs between electrodes. This electrochemical reaction results in ion transfer through the separator, which causes electrons to collect at the negative terminal of the cell. When connected to a load, such as the electronic components of the block diagram schematic (110) of FIG. 1, the electrons flow from the negative pole through the circuitry in the load to the positive terminal of the cell. This is shown in conventional circuit diagrams as current flowing from the cathode to the anode.

When the rechargeable electrochemical cells are charged, the opposite process occurs. Thus, to power electronic devices such as the deformable electronic device 100, these electrons must be delivered from the cell to electrical components. This is generally accomplished by coupling conductors, such as conductive foil strips, sometimes referred to colloquially as "electrical tabs" to the various layers.

This electrode construct can then be stacked. Once stacked, the electrode stack can be rolled into a "jellyroll" configuration so that the same can be placed in a cylindrical can that defines the exterior surface of the rechargeable electrochemical cell. Illustrating by example, two electrodes constructed as described above can be stacked, with one electrode fabricated with a layer of active electrode material, such as an electrochemically active negative electrode material, while the other electrode is fabricated with a layer of electrochemically active positive electrode material.

A first tab can be coupled to one electrode, while a second tab is coupled to the other electrode. These tabs can be coupled to the current collectors of each electrode.

In one or more embodiments, the electrodes are arranged in stacked relationship, with the tabs being disposed on opposite edges of the stack. Thereafter, the stack is rolled into a roll, sometimes referred to as a "jellyroll," for a subsequent insertion into an electrochemical cell housing such as a cylindrical can. The cylindrical cans can each be a metal can or a plastic can. They can also be a flexible pouch, such as would be the case where the electrode assembly was a prismatic electrode assembly. Where metal or plastic, the housing can be configured to be cylindrical such that the rechargeable electrochemical cells can situated within each pivot member 103. However, in other constructs the rechargeable electrochemical cell can be rectangular or ovular in cross section. Where non-cylindrical such rechargeable electrochemical cells can be configured to serve as the pivot.

When the electrodes are rolled, one tab will end up substantially in the center of the roll, while the other tab will end up generally on the periphery of the roll. When the roll is placed in the cylindrical can housing, this results in one tab being be centrally disposed within the cylindrical can, while the other tab is disposed peripherally within the cylindrical can.

These tabs can be routed different ways within the cylindrical cans. In one or more embodiments one tab is routed to the right end of the cylindrical can, which serves as one external electrode for the rechargeable electrochemical cell. Meanwhile, the other tab is routed to the left end of the cylindrical can, which serves as the other external electrode for the rechargeable electrochemical cell. This construct works well when the rechargeable electrochemical cell is used as the pivot for the pivot members 103 in that one electrical contact can be biased against the first external electrode on the right end of the rechargeable electrochemical cell, while another electrical contact is biased against the second electrode on the left end of the rechargeable electrochemical cell. The rechargeable electrochemical cell can then remain stationary as the pivot members 103 are actuated with each electrical contact remaining stationary and biased against a single location of first external electrode on the right end of the rechargeable electrochemical cell and the second electrode on the left end of the rechargeable electrochemical cell, respectively.

In other embodiments, however, both tabs can be routed to one end of the rechargeable electrochemical cell. A first external electrode and a second external electrode can be positioned on the same end of the rechargeable electrochemical cell. The first external electrode and the second external electrode can then be concentrically aligned. This allows the rechargeable electrochemical cell to rotate in each pivot member 103 if necessary.

For the rechargeable electrochemical cells, the cylindrical cans can be sealed in a variety of ways. In one illustrative embodiment, the cylindrical cans can be sealed by a lid defining each end of the cylindrical can. The lids, which can be manufactured from metal, are connected to the internal tabs and serve as one electrical terminal of the rechargeable electrochemical cells. An insulator can be provided to isolate the lid from the other tab. The second tab can be the coupled to another location, be it the left end, the outer, concentrically aligned external electrode, or the second external electrode. In other embodiments, such as when the cylindrical cans are manufactured from aluminum, the cylindrical can itself can be connected to the cathode. Conversely, where the cylindrical can is manufactured from steel, it will be connected to the anode.

In alternate embodiments, the tabs can be connected to a terminal block rather than to the lid and housing. The end of each energy storage device could comprise a terminal block, for example. The terminal block, where employed, provides a convenient way for both the positive terminal and negative terminal to reside on a common end of the energy storage device. In one or more embodiments coatings, wraps, overlays, or other components can be applied the cylindrical cans when the rechargeable electrochemical cells are used as the pivots of the linkage members.

In one or more embodiments, the pivot members 103 provide one or more different mechanical functions for the deformable electronic device 100. Illustrating by example, the pivot members 103 can provide mechanical support for both the foldable substrate coupled to the display 102 and the display 102 itself when the deformable electronic device 100 is planar in the open position shown above in FIG. 1. Moreover, when the deformable electronic device 100 is in the folded position, the pivot shafts of each pivot member 103 move together to provide full support for the underside major surface of flexible substrate supporting the display 102, which is disposed adjacent to the pivot members 103.

In one or more embodiments, the links coupling each pivot shaft of the pivot members 103 together can be configured to provide one or more optional mechanical functions as well. For example, in one embodiment, the links include a protuberance providing a stop stage that operates to retain the deformable electronic device 100 in a planar geometric configuration. If the amount of force required to deform the deformable electronic device 100 is, for example, five Newtons ordinarily, the inclusion of a stop stage in the pivot members 103 may require a greater amount of force, such as eleven Newtons, to bend the deformable electronic device 100 from the substantially planar state to a deformed state.

In one or more embodiments, the pivot members 103 are not only operable to facilitate bending of the deformable electronic device 100 but also to change the distance between the electronic circuit component housing (106) to other components situated within another electronic circuit component housing (127). Embodiments of the disclosure contemplate that for optimal bending of the display 102, it can be advantageous for the overall length of the deformable electronic device 100 to change during bending operations.

In one or more embodiments, when the electronic device 100 bends it effectively shortens in length due to the fact that pivot members 103 move toward one another at the bending locations of the electronic device 100. Meanwhile, the display 102, as well as the stainless-steel sheet of the flexible substrate supporting the display 102, remain an effectively constant length regardless of the shape of the electronic device 100. Since stainless steel cannot stretch, the display 102 remains a constant length despite the fact that some of the pivot members 103 may move closer together at bend locations.

Figure 5:
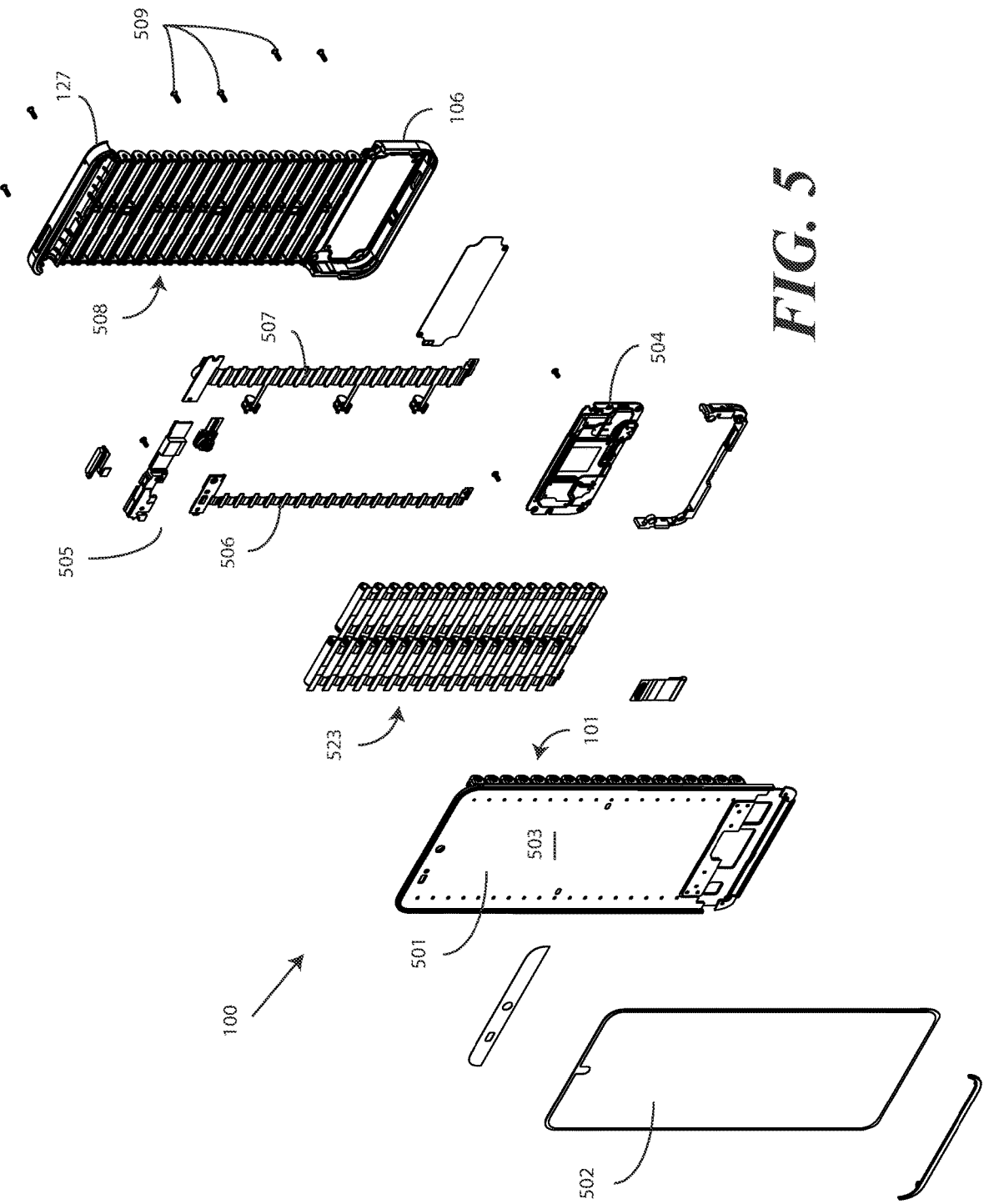
FIG. 5 illustrates an exploded view of one explanatory deformable electronic device in accordance with one or more embodiments of the disclosure.

Turning now to FIG. 5, illustrated therein is an exploded view of the deformable electronic device 100 of FIG. 1. While FIG. 5 provides a general illustration of the various components of the deformable electronic device 100 for reference, a more detailed discussion of individual components will occur with reference to the figures that follow.

In one or more embodiments, the deformable electronic device 100 comprises a flexible substrate 501. In one or more embodiments, the flexible display 502 comprises one or more layers that are coupled or laminated together to complete the flexible display 502. In one or more embodiments, these layers comprise a flexible protective cover, a first adhesive layer, a flexible display layer, a second adhesive layer, and a flexible substrate. Other configurations of layers suitable for manufacturing the flexible display 502 will be obvious to those of ordinary skill in the art having the benefit of this disclosure.

Viewing the flexible display 502 as a stack, beginning from the top of the layer stack (which is to the left as the flexible display 502 is viewed in FIG. 5), in one or more embodiments the flexible protective cover comprises an optically transparent substrate. In one or more embodiments the flexible protective cover may be manufactured from an optically transparent material such a thin film sheet of a thermoplastic material. Illustrating by example, in one embodiment the flexible protective cover is manufactured from a layer of optically transparent polyimide having a thickness of about eighty microns. In another embodiment, the flexible protective cover is manufactured from a layer of optically transparent polyethylene terephthalate. Other materials suitable for manufacturing the flexible protective cover will be obvious to those of ordinary skill in the art having the benefit of this disclosure.

In one or more embodiments the flexible protective cover functions as a fascia by defining a cover for the flexible display layer. In one or more embodiments the flexible protective cover is optically transparent, in that light can pass through the flexible protective cover so that objects behind the flexible protective cover can be distinctly seen. The flexible protective cover may optionally include an ultra-violet barrier. Such a barrier can be useful in improving the visibility of flexible display 502 in one or more embodiments.

Beneath the flexible protective cover is a first adhesive layer. In one or more embodiments, the first adhesive layer comprises an optically transparent adhesive. The optically transparent adhesive can be applied to two sides of a thin, optically transparent substrate such that the first adhesive layer functions as an optically transparent layer having optically transparent adhesive on both sides. Where so configured, in one or more embodiments the first adhesive layer has a thickness of about fifty microns. This optically transparent version of "double-sided tape" can then be spooled and applied between the flexible protective cover and the flexible display layer to couple the two together.

In other embodiments the first adhesive layer will instead be applied between the flexible protective cover and the flexible display layer as an optically transparent liquid, gel, as a homogeneous adhesive layer, or in the form of another medium. Where so configured, the first adhesive layer can optionally be cured by heat, ultraviolet light, or other techniques. Other examples of materials suitable for use as the first adhesive layer will be obvious to those of ordinary skill in the art having the benefit of this disclosure. In one or more embodiments, the first adhesive layer mechanically couples the flexible display layer to the flexible protective cover.

In one or more embodiments, the flexible display layer is situated between the flexible substrate and the flexible protective cover. The flexible display layer can optionally be touch-sensitive. In one or more embodiments, the flexible display layer is configured as an organic light emitting diode (OLED) display layer. When coupled to a display layer substrate, the display layer substrate can bend in accordance with various bending radii.

In one or more embodiments the display layer substrate may be formed from multiple layers of flexible material such as flexible sheets of polymer or other materials. Illustrating by example, the display layer substrate can include a layer of optically pellucid electrical conductors, a polarizer layer, one or more optically transparent substrates, and layers of electronic control circuitry such as thin film transistors to actuate pixels and one or more capacitors for energy storage.

In one or more embodiments, to be touch sensitive the flexible display layer includes a layer including one or more optically transparent electrodes. In one or more embodiments, the flexible display layer includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer. Other layers suitable for inclusion with the flexible display layer will be obvious to those of ordinary skill in the art having the benefit of this disclosure.

In one or more embodiments, the flexible display 502 is coupled to flexible substrate 501 by a second adhesive layer. In one or more embodiments, the flexible substrate 501 comprises a thin layer of steel. Illustrating by example, in one or more embodiments the flexible substrate 501 comprises a steel layer with a thickness of about one hundred microns. While thin, flexible steel works well in practice, it will be obvious to those of ordinary skill in the art having the benefit of this disclosure that other materials can be used for the flexible substrate 501 as well. For instance, in another embodiment the flexible substrate 501 is manufactured from a thin layer of thermoplastic material.

In one or more embodiments, to simplify manufacture, the second adhesive layer is identical to the first adhesive layer and comprises an optically transparent adhesive. However, since the second adhesive layer is coupled between the flexible display 502 and the flexible substrate 501, i.e., under the flexible display 502, an optically transparent adhesive is not a requirement. The second adhesive layer could be partially optically transparent or not optically transparent at all in other embodiments. In one or more embodiments, the second adhesive layer comprises a foam-based adhesive consisting of a thin foam core with adhesive coated on both sides. A common thickness for such a foam-based adhesive is about 150 microns. The foam-based adhesive may be applied selectively to only portions of the flexible display 502 in one or more embodiments.

Regardless of whether the second adhesive layer is optically transparent, in one or more embodiments the adhesive of the second adhesive layer is applied to two sides of a thin substrate material. Where so configured, in one or more embodiments the second adhesive layer has a thickness of about fifty microns. This extremely thin version of "double-sided tape" can then be spooled and applied between the flexible display 502 and the flexible substrate 501 to couple the two together.

In other embodiments, as with the first adhesive layer, the second adhesive layer will instead be applied between the flexible display 502 and the flexible substrate 501 as a liquid, gel, as a homogeneous layer, or in the form of another medium. Where so configured, the second adhesive layer can optionally be cured by heat, ultraviolet light, or other techniques. Other examples of materials suitable for use as the second adhesive layer will be obvious to those of ordinary skill in the art having the benefit of this disclosure.

The deformable link assembly 101 is shown in an assembled state attached to a rear major face of the flexible substrate 501. In one or more embodiments, the deformable link assembly 101 comprises a plurality of pivot shafts each having its central axis aligned substantially parallel with a surface defined by the flexible substrate 501. Each pivot shaft of the plurality of pivot shafts is supported by a corresponding stanchion extending distally from the flexible substrate 501. In one or more embodiments, each pivot shaft comprises a polished, hardened stainless steel shaft that is laser welded to its corresponding stanchion.

In one or more embodiments, pairs of stanchions support pairs of pivot shafts of the plurality of pivot shafts and extend distally from a corresponding bracket of a plurality of brackets that abut the rear major surface of the flexible substrate 501. One or more rechargeable batteries 523 are situated between pairs of stanchions atop corresponding brackets. A flexible display 502 abuts a front major surface 503 of the flexible substrate 501 on an opposite side of the flexible substrate 501 relative to the deformable link assembly 101.

In one or more embodiments, one or more embodiments electronic circuit components 504, 505 are electrically coupled between the one or more rechargeable batteries 523 and the flexible display 502. The electronic circuit components 504, 505 can include circuit boards, antennas, image capture devices, processors, and other components described above with reference to FIG. 1.

The electronic circuit components 504, 505 can be electrically coupled together by conductors 506, 507 or a bus passing along the one or more rechargeable batteries 523. In one or more embodiments the conductors 506, 507 comprise flexible circuits spanning the length of the deformable electronic device 100 with flexible regions that span across each of the flexing regions of the deformable electronic device 100 to electrically interconnect all the electronic circuit components 504, 505. In one or more embodiments, the one or more rechargeable batteries 523 each comprise small cylindrical battery cells to create as many bending sections as possible so that the deformable electronic device 100 can be bent into as many different shapes as possible.

In this illustrative embodiment, the conductors 506, 507 comprise a flexible substrate spanning the deformable link assembly 101 to electrically couple the electronic circuit components 504 situated in the electronic circuit component housing 106 to other electronic circuit components 505 situated within another electronic circuit component housing 127.

In one or more embodiments, a plurality of covers 508 are included. In one or more embodiments, each cover of the plurality of covers 508 covers the one or more rechargeable batteries 523 situated between pairs of stanchions of the deformable link assembly 101 atop the corresponding brackets supporting each pair of stanchions. In one or more embodiments, the covers of the plurality of covers 508 do this without touching neighboring covers when the deformable electronic device 100 is in the substantially planar state shown in FIG. 5. One or more screws 509 can retain the deformable electronic device 100 together.

In other embodiments, the plurality of covers 508 could be replaced by a housing subassembly comprising both rigid and flexible materials, with a flexible material interconnecting together each cover of the plurality of covers 508, the electronic circuit component housing (106), and the other electronic circuit component housing (127). In one or more embodiments, a fabric or elastomer can be used as the flexible material. The flexible material could connect from underneath the electronic circuit component housing (106) and the other electronic circuit component housing (127) whereby it serves to cosmetically close the gaps between the rigid housings and prevent particle ingress. In other embodiments, the flexible material could connect any rigid housings from the outside, with the flexible material being the primary exterior cosmetic surface. This latter embodiment creates a more contiguous appearance across the back of the electronic device 100.

Now that the general components of the deformable electronic device 100 have been introduced, attention will be turned to a more detailed discussion of some of these components. Beginning with FIG. 6, illustrated therein is the flexible substrate 501 that supports the plurality of pivot shafts and the flexible display in a deformable electronic device. In one or more embodiments. The flexible substrate comprises a layer of steel. In one or more embodiments, the flexible substrate 501 comprises a steel layer with a thickness of about one hundred microns.

In one or more embodiments, the flexible substrate 501 comprises a flexible, substantially flat support layer. The flexible substrate 501 transitions from a substantially planar shape when undeformed to a shape that is deformed by one or more bends when loading forces are applied. In one or more embodiments, the flexible substrate 501 is manufactured from stainless steel. In another embodiment, the flexible substrate 501 is manufactured from a thin, flexible thermoplastic sheet. Other materials can be used in manufacturing the flexible substrate 501 as well. For example, the material nitinol, which is a nickel-titanium alloy, can be used to manufacture the flexible substrate 501. Other flexible, substantially planar materials will be obvious to those of ordinary skill in the art having the benefit of this disclosure.

Accordingly, the flexible substrate 501 defines a mechanical support layer for the flexible display of a deformable electronic device. In one or more embodiments, the flexible substrate 501 includes a reinforcing border comprising a thicker layer of material, one example of which is silicone, to further protect the flexible display to which the flexible substrate 501 is attached when the corresponding deformable electronic device is in the substantially planar state.

In this illustrative embodiment, the flexible substrate 501 comprises a silicone border 602 positioned around a perimeter of the flexible substrate 501 on three sides. In one or more embodiments, the silicone border 602 surrounds and protects the edges of the flexible display to which the flexible substrate 501 is attached. In one or more embodiments, the silicone border 602 is co-molded around the one or more portions of the perimeter of the flexible substrate 501.

Figures 6, 7:
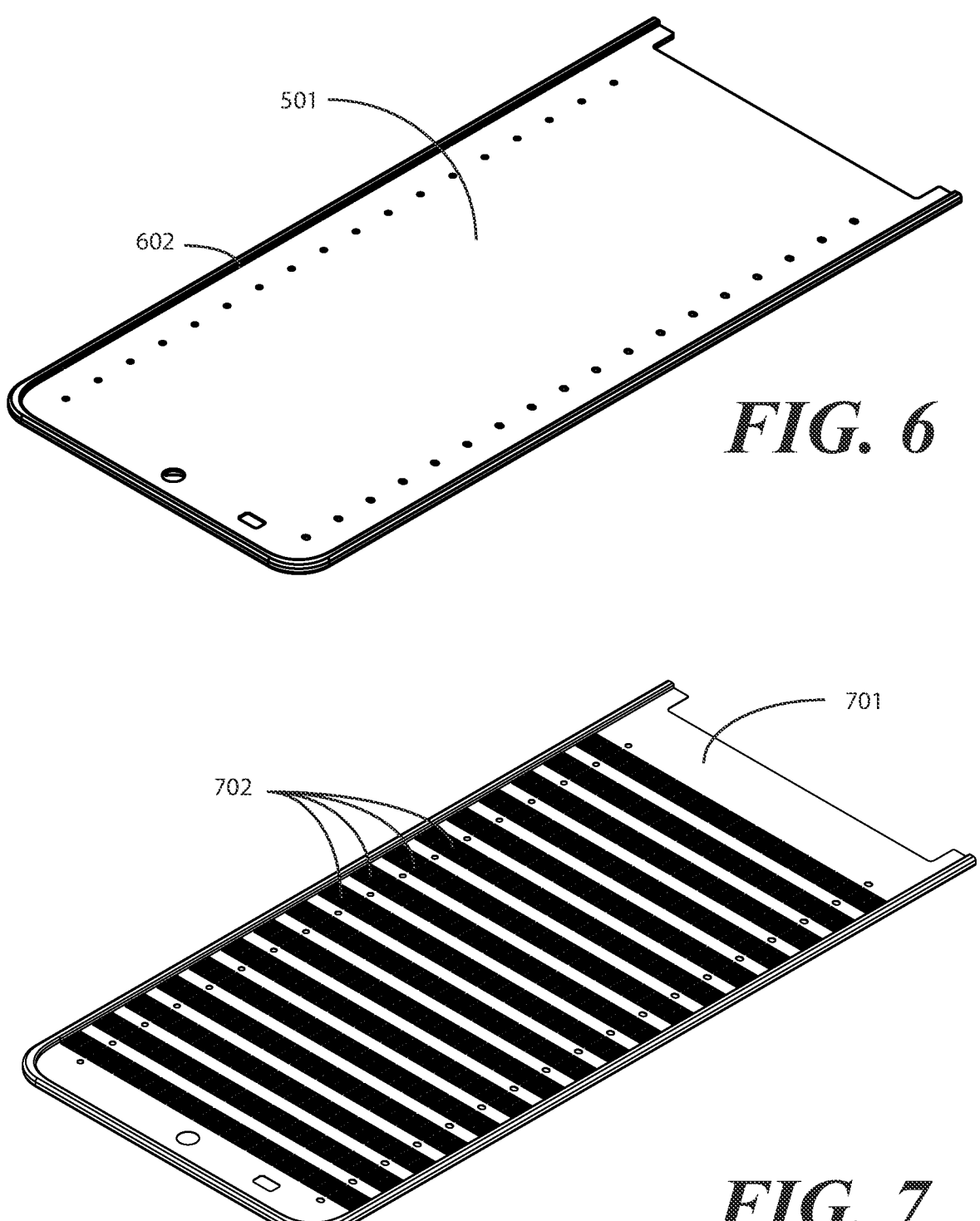
FIG. 6 illustrates one explanatory flexible substrate in accordance with one or more embodiments of the disclosure.
FIG. 7 illustrates another explanatory flexible substrate in accordance with one or more embodiments of the disclosure.

In one or more embodiments, the flexible substrate 501 can define one or more apertures as shown in FIG. 6. These apertures can be used for a variety of purposes. Illustrating by example, some of the apertures can be used to rigidly fasten the flexible substrate to one or more brackets supporting pairs of stanchions supporting a plurality of pivot shafts engaging an inner group of links and an outer group of links that allow the deformable electronic device into which the flexible substrate 501 is integrated to deform from a substantially planar state to a deformed state.

Additionally, some of the apertures can contain magnets. Hall-effect sensors positioned in the deformable electronic device to which the flexible substrate 501 is coupled can then detect the positions of these magnets such that the one or more processors (112) can determine whether the flexible substrate 501 is in a deformed state or a substantially planar state or somewhere in between.

In one or more embodiments, the flexible display coupled to the flexible substrate 501 situates within the confines of the silicone border 602. In one or more embodiments, the silicone border 602 defines a singular, contiguous, unitary piece of silicone. In the illustrative embodiment of FIG. 6, the silicone border 602 surrounds three sides of the flexible substrate 501 and fails to pass along a minor side that defines a receiving recess that can accommodate mechanical and electrical components such as electronic circuit components to power and control the flexible display that will situate within the perimeter defined by the silicone border 602. Other items that may be situated along this minor side include a tensioner to keep the flexible display flat across the flexible substrate 501, flexible circuits, and other components.

Turning now to FIG. 7, illustrated therein is another flexible substrate 701. The flexible substrate 701 of FIG. 7 except for the fact that it includes etched lateral sections 702 that removing material from the flexible substrate 701 to make those sections more flexible than the stiffer sections where material has not been removed. This results in the flexible substrate 701 having more flexible portions and stiffer portions.

Since the flexible substrate 701 is manufactured from a metal in one or more embodiments, one example of which is steel having a thickness of one hundred microns, the stiffer sections get their rigidity from the material from which it is manufactured. This stiffness helps to protect portions of the flexible display to which the flexible substrate 701 is attached.

By contrast, the more flexible portions allow enhanced bending around lateral axes when the flexible substrate 701 is deformed. Since the flexible portions are manufactured from the same material as the stiffer portions when the flexible substrate 701 is manufactured as a single unitary part, the removed material allows the flexible substrate 701 to more easily bend along these portions. Illustrating by example, in one or more embodiments where the flexible substrate 701 is manufactured from steel, a plurality of chemically or laser etched linear segments can allow the flexible portions to more tightly deform. Thus, in one or more embodiments the flexible substrate 701 comprises sections that are stiffer and others that are more flexible.

Figures 8, 9:
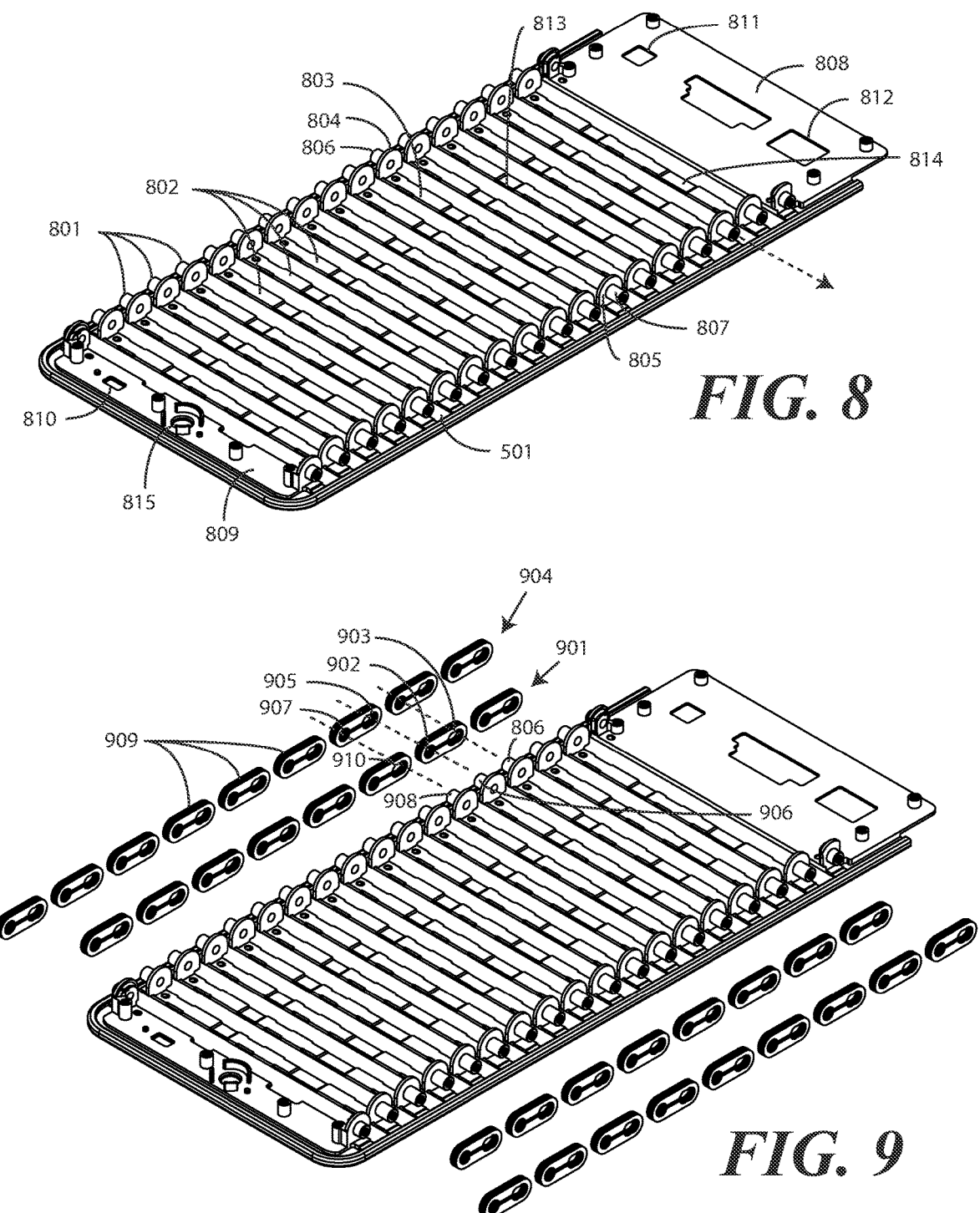
FIG. 8 illustrates a first partial deformable electronic device assembly in accordance with one or more embodiments of the disclosure.
FIG. 9 illustrates an exploded view of a second partial deformable electronic device assembly in accordance with one or more embodiments of the disclosure.

Turning now to FIG. 8, illustrated therein is the flexible substrate 501 of FIG. 6 supporting a plurality of pivot shafts 801 each having its central axis aligned substantially parallel with a major surface (503) defined by the flexible substrate 501. In one or more embodiments, each pivot shaft of the plurality of pivot shafts 801 extends distally from a corresponding bracket of a plurality of brackets 802. In this illustrative embodiment, each bracket has two stanchions extending distally from its opposite ends. Illustrating by example, bracket 803 has a first stanchion 804 extending from a first end and a second stanchion 805 extending from a second end. As such bracket 803 separates, and is situated between, the first stanchion 804 and the second stanchion 805. In this manner, pairs of stanchions, e.g., first stanchion 804 and second stanchion 805, support pairs of pivot shaft of the plurality of pivot shafts 801, e.g., first pivot shaft 806 and second pivot shaft 807, that extend distally from their corresponding bracket of the plurality of brackets 802 abutting the flexible substrate 501.

In one or more embodiments, each bracket of the plurality of brackets 802 is manufactured from stainless steel and is laser-welded to the flexible substrate 501. In one or more embodiments, each bracket and stanchion pair, e.g., bracket 803 and first stanchion 804 and second stanchion 805, is manufactured as a single, unitary part, with the first stanchion 804 and the second stanchion 805 being bent orthogonally from the central portion of bracket 803 after manufacture. Thereafter, the pivot shafts, e.g., pivot shaft 806 and pivot shaft 807, are welded to each corresponding stanchion. In one or more embodiments, each pivot shaft is manufactured from hardened, polished steel.

In the illustrative embodiment of FIG. 8, all brackets of the plurality of brackets 802 are the same except for the two end brackets 808, 809 that situate beneath the electronic circuit component housing (106) and the other electronic circuit component housing (127) respectively. These brackets 808, 809 are configured differently because they are configured to support the electronic circuit components (504, 505) that provide device functionality and allow for content to be presented to the flexible display (502) that will ultimately be attached to the opposite side of the flexible substrate 501. To this end, these brackets 808, 809 can include apertures, e.g., apertures 810, 811, 812, which allow conductors, flexible substrates, and other signal conduits to pass from one side of the flexible substrate 501 to the other side of the flexible substrate 501 as necessary to power and control the flexible display (502).

Another feature of note in FIG. 8 is the fact that each bracket of the plurality of brackets 802 defines a pair of recessed passageways 813, 814 therein. As previously described, in one or more embodiments one or more rechargeable batteries (523) will be situated between pairs of stanchions atop each corresponding bracket. In one or more embodiments, these pair of recessed passageways 813, 814 allow for the flexible conductors (506, 507) to pass beneath these one or more rechargeable batteries (523) to provide an electrical connection pathway between the electronic circuit components (504, 505) that provide device functionality and allow for content to be presented to the flexible display (502) that will ultimately be attached to the opposite side of the flexible substrate 501. In one or more embodiments, the flexible conductors (506, 507) are not directly coupled to the one or more rechargeable batteries (523). Instead, the one or more rechargeable batteries (523) are coupled to another flexible conductor. In FIG. 5, the one or more rechargeable batteries (523) are shown in an assembled form, with each battery soldered to this additional flexible conductor, which then connects to electronic circuit components (504). Aperture 815 can allow for an image capture device, which situates within the circular flanges situated around aperture 815, to have a field of view through the flexible substrate 501. In this illustrative embodiment, one recessed passageway 813 is narrower than the other, although in other embodiments the recessed passageways 813, 814 can be the same size. In still other embodiments, the other recessed passageway 814 can be narrower than the first, and so forth. The structure of FIG. 8 defines a partial deformable electronic device assembly for a deformable electronic device in accordance with one or more embodiments of the disclosure.

Turning now to FIG. 9, illustrated therein is an exploded view of another partial deformable electronic device assembly in accordance with one or more embodiments of the disclosure. As shown, an inner group 901 of links each defining a pivoting aperture 902 within which each pivot shaft 906 may rotate and a sliding aperture 903 within which another, adjacent pivot shaft 806 may both rotate and translate laterally is positioned to engage the plurality of pivot shafts (801). Similarly, an outer group 904 of links each defining another sliding aperture 905 within which each pivot shaft 906 may both rotate and translate laterally and another pivoting aperture 907 within which each adjacent pivot shaft 908 may rotate.

As shown, in this illustrative embodiment the links of the plurality of links 909 are interleaved in an overlapping arrangement. This means that odd instances of the plurality of pivot shafts (801), one of which is represented by pivot shaft 906, each engage pivoting apertures, e.g., pivoting aperture 902, of the inner group 901 of links while even instances of the plurality of pivot shafts (801), one of which is represented by pivot shaft 908, engage sliding aperture, e.g. sliding aperture 910, of the inner group 901 of links. Similarly, even instances of the plurality of pivot shafts (801), e.g., pivot shaft 908, engage other pivoting apertures, e.g., pivoting aperture 907 of the outer group 904 of links while odd instances of the plurality of pivot shafts (801), e.g., pivot shaft 906, engage other sliding apertures, e.g., sliding aperture 905, of the outer group 904 of links.

Accordingly, as shown odd instances of the plurality of pivot shafts (801) engage the pivoting aperture of a link of the plurality of links 909 before the sliding aperture of another link of the plurality of links 909 as they extend distally from their corresponding stanchion. By way of example, pivot shaft 906 engages pivoting aperture 902 of the inner group 901 of links before engaging the sliding aperture 905 of the outer group 904 of links. Similarly, even instances of each pivot shaft of the plurality of pivot shafts (801) engages the sliding aperture of another link of the plurality of links 909 before the pivoting aperture of another link of the plurality of links 909 as they extend distally from their corresponding stanchions. Illustrating by example, pivot shaft 908 engages sliding aperture 910 of the inner group 901 of links before engaging a pivoting aperture 907 of the outer group 904 of links, and so forth.

Thus, in one or more embodiments odd instances of each pivot shaft of the plurality of pivot shafts (801) engage the pivoting aperture of a link of the plurality of links 909 while even instances of each pivot shaft of the plurality of pivot shafts (801) engage the sliding aperture of another link of the plurality of links 909. Where the inner link of this overlapping, interleaved arrangement defines the pivoting aperture engaging the pivot shaft, the pivot shaft engages the pivoting aperture of the link before engaging the sliding aperture of another link of the plurality of links as the pivot shaft extends distally from its corresponding stanchion. Similarly, an adjacent pivot shaft would engage the sliding aperture of that link before engaging the pivoting aperture of another link as it extends distally from its corresponding stanchion.

Figures 10, 11, 12:
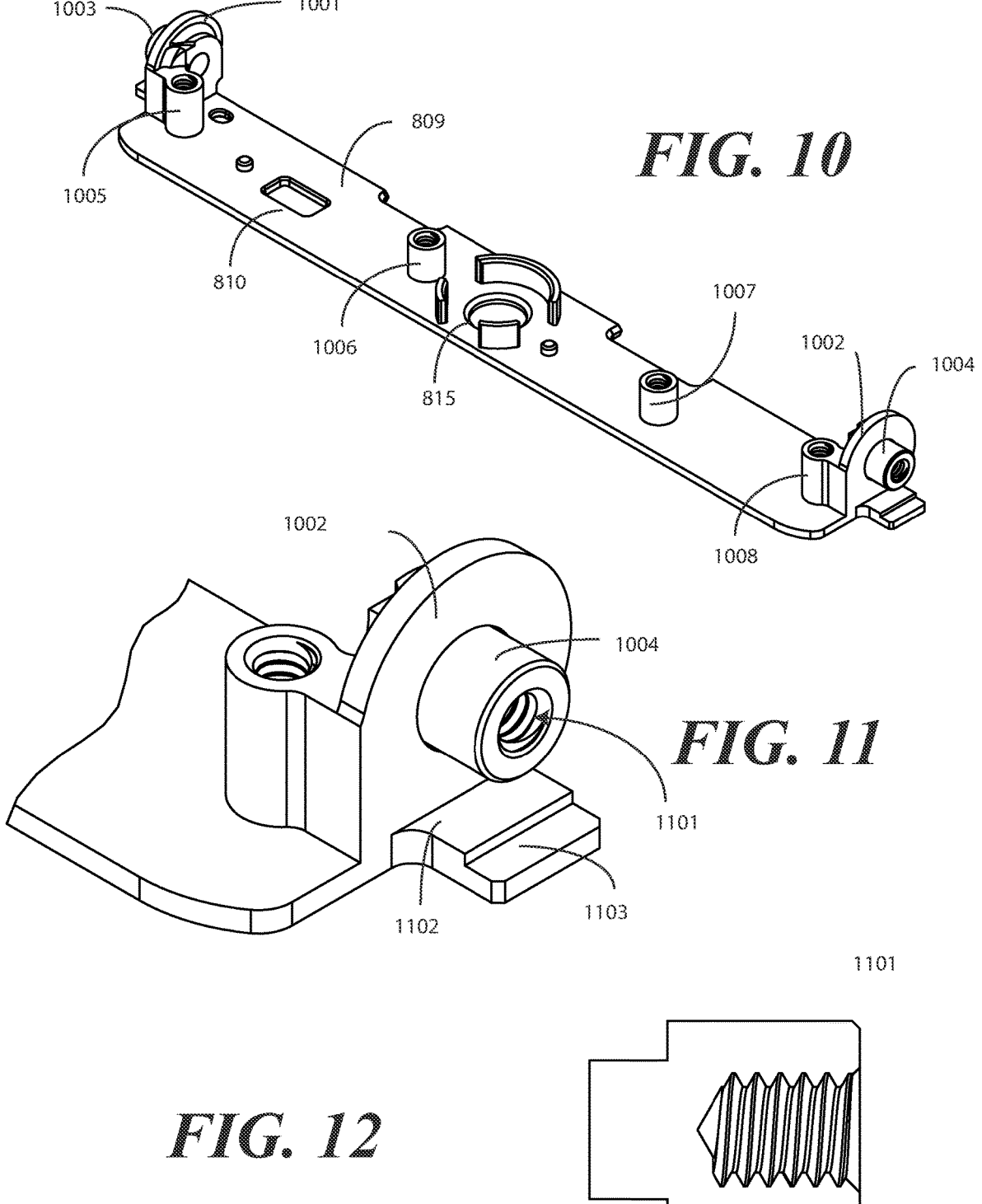
FIG. 10 illustrates one explanatory bracket in accordance with one or more embodiments of the disclosure.
FIG. 11 illustrates one explanatory pivot shaft in accordance with one or more embodiments of the disclosure.
FIG. 12 illustrates a sectional view of one explanatory pivot shaft in accordance with one or more embodiments of the disclosure.

Now that the brackets, stanchions, pivot shafts, and links have been generally introduced, attention will be turned to each component in greater detail. Turning first to FIG. 10, illustrates therein is an end bracket 809 configured in accordance with one or more embodiments of the disclosure. This particular bracket 809 has two stanchions 1001, 1002 extending distally from its ends. Each stanchion 1001, 1002 supports a corresponding pivot shaft 1003, 1004. In one or more embodiments each stanchion 1002 is formed from the same part as the bracket. In one or more embodiments, the pivot shafts are machined and heat treated through separate manufacturing processes to achieve very tight diameter tolerance control, and very high hardness, as needed to control fit with and prevent wear from the interference fits of the links.

As previously noted, in one or more embodiments bracket 809 can define one or more apertures 810, 815 that allow electrical connections to pass through the flexible substrate to which the bracket 809 is coupled for powering and controlling a flexible display or other user interface. In this illustrative embodiment, aperture 815 is circular and is situated between three partially spherical upright walls so that an image capture device can be positioned between these upright walls so as to have a field of view through the aperture 815 and through the corresponding flexible substrate. Aperture 810 allows an ambient light sensor to sense ambient light brightness through aperture 810.

In one or more embodiments, the bracket 809 also defines one or more screw bosses 1005, 1006, 1007, 1008 configured to receive screws to retain the electronic circuit component housing (127) fixedly above the electronic circuit components (504) that situate atop the bracket 809. In this illustrative embodiment, screw bosses 1005, 1008 each form a portion of a unitary component defined by these screw bosses 1005, 1008 and their corresponding stanchions 1001, 1002 and are slightly offset from a central bore axis of each pivot shaft 1003, 1004 supported by each stanchion 1001, 1002.

Turning now to FIG. 11, illustrated therein is stanchion 1002 in more detail. As shown, the pivot shaft 1004 extending distally from this stanchion defines a threaded central bore 1101, which is shown in cross sectional detail in FIG. 12. As will be described below with reference to FIG. 19, in one or more embodiments a screw can engage this threaded central bore 1101 to retain links engaging the pivot shaft 1004 between the stanchion 1002 and the corresponding screw head or a fastener cap situated between the links and the screw head.

Also shown in FIG. 11 is a stair-stepped mechanical stop comprising a first stop level 1102 and a second stop level 1103. As will be described below with reference to FIGS. 29-32, in one or more embodiments these stops prevent the corresponding deformable electronic device from becoming over deformed in the deformed state or hyper extending beyond the substantially planar state.

Figure 13:
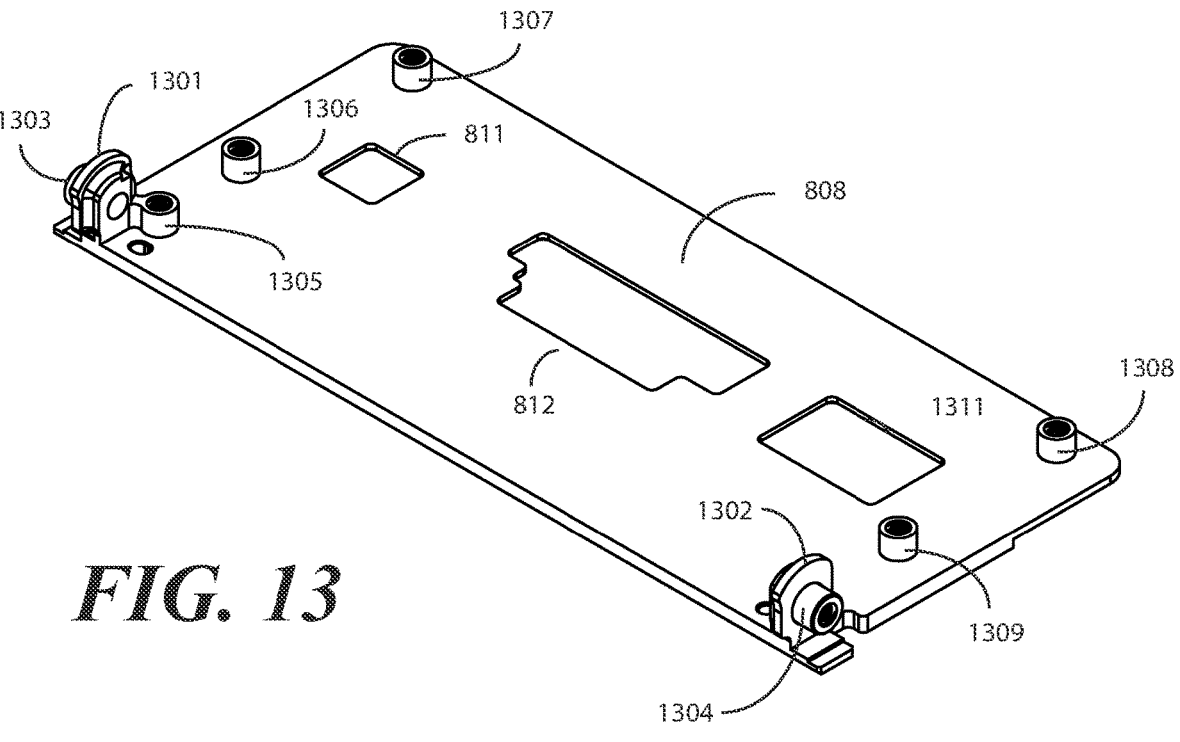
FIG. 13 illustrates another explanatory bracket in accordance with one or more embodiments of the disclosure.

Turning now to FIG. 13, illustrates therein is another end bracket 808 configured in accordance with one or more embodiments of the disclosure. This particular bracket 808 has two stanchions 1301, 1302 extending distally from its ends. Since this particular bracket is substantially wider than are each stanchion 1301, 1302, in this illustrative embodiment the stanchions 1301, 1302 are situated in corners of the bracket 808 on opposite sides of the bracket 808.

Each stanchion 1301, 1302 supports a corresponding pivot shaft 1303, 1304. The bracket 808 defines one or more apertures 811, 812, 1311 that allow electrical connections to pass through the flexible substrate to which the bracket 808 is coupled for powering and controlling a flexible display or other user interface. Additionally, apertures 811, 812, 1311 can also provide space for surface mount electronic components that are reflowed into the back of the display's flexible conductor. These 811, 812, 1311 allow nesting of those components into the thickness of bracket 808, helping to minimizing overall thickness of the electronic device and making it easier to better support this region of the display. The bracket 808 also defines one or more screw bosses 1305, 1306, 1307, 1308, 1309. Another screw boss is positioned in an equivalent relationship to stanchion 1302 as is screw boss 1305 to stanchion 1301 but hidden in this particular view. Each screw boss 1305, 1306, 1307, 1308, 1309 is configured to receive screws to retain the electronic circuit component housing (106) fixedly above the electronic circuit components (505) that situate atop the bracket 808. In this illustrative embodiment, screw boss 1305 and the corresponding screw boss hidden behind stanchion 1302 each form a portion of a unitary component defined by these screw bosses 1305 and their corresponding stanchions 1301, 1302 and are slightly offset from a central bore axis of each pivot shaft 1303, 1304 supported by each stanchion 1301, 1302.

Figure 14:
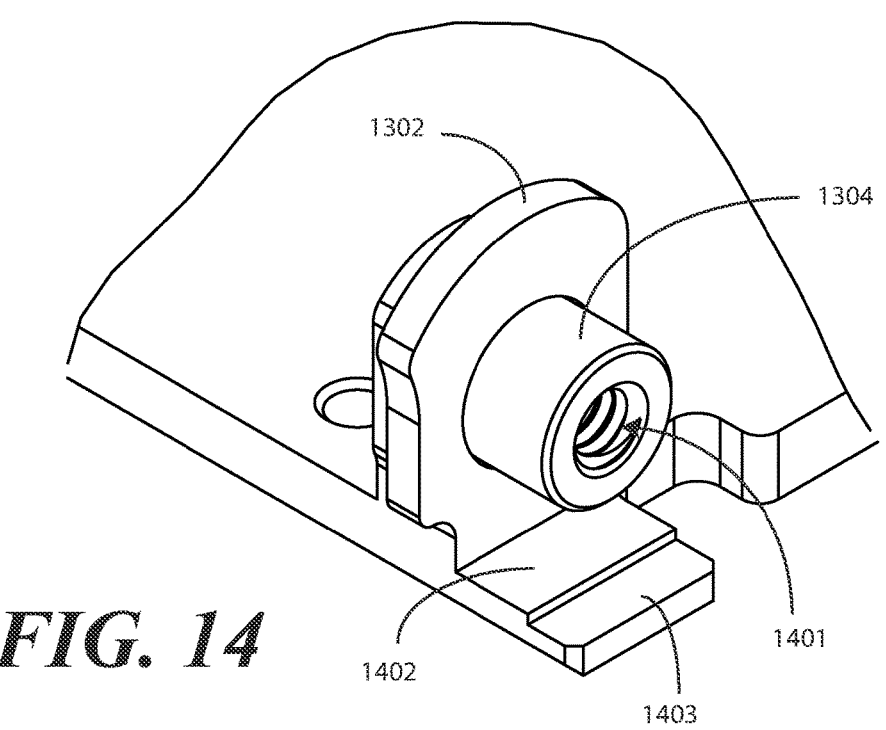
FIG. 14 illustrates another explanatory pivot shaft in accordance with one or more embodiments of the disclosure.

Turning now to FIG. 14, illustrated therein is stanchion 1302 in more detail. As shown, the pivot shaft 1304 extending distally from this stanchion defines a threaded central bore 1401. A screw can engage this threaded central bore 1401 to retain links engaging the pivot shaft 1304 between the stanchion 1302 and the corresponding screw head or a fastener cap situated between the links and the screw head.

Also shown in FIG. 14 is a stair-stepped mechanical stop comprising a first stop level 1402 and a second stop level 1403. In one or more embodiments these stops prevent the corresponding deformable electronic device from becoming over deformed in the deformed state or hyper extending beyond the substantially planar state.

Figure 15:
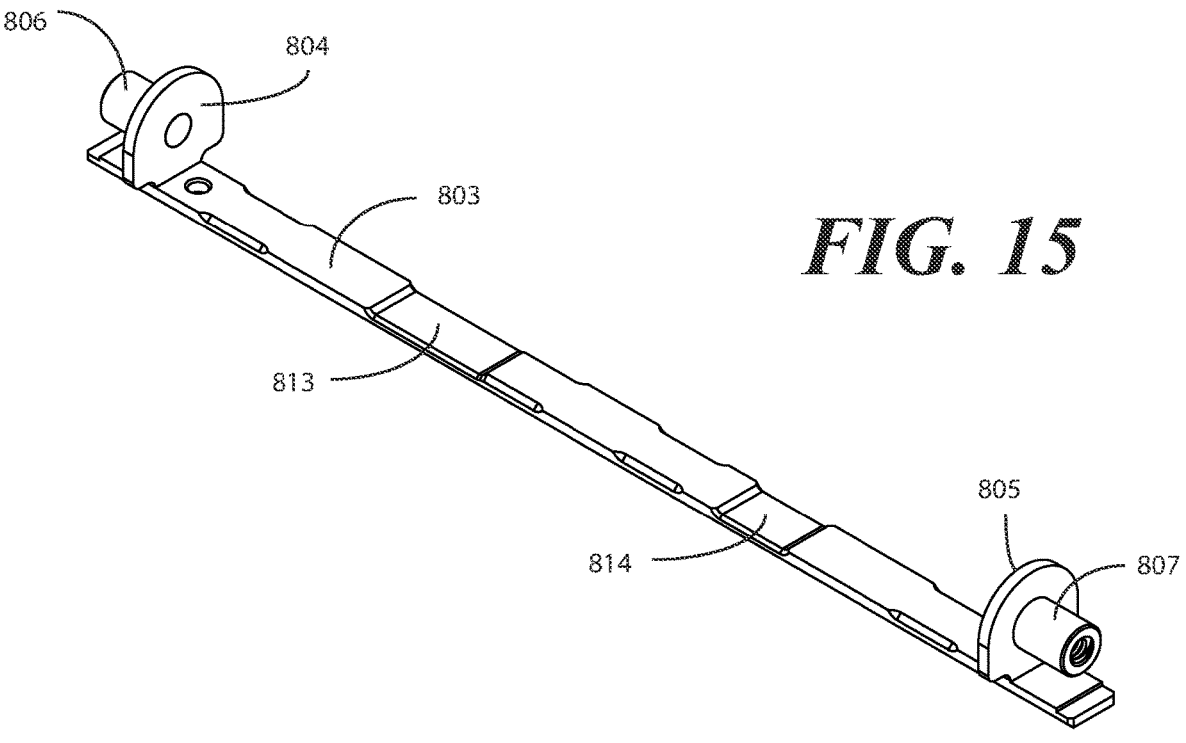
FIG. 15 illustrates yet another bracket in accordance with one or more embodiments of the disclosure.

Turning first to FIG. 15, illustrates therein is a central bracket 803 configured in accordance with one or more embodiments of the disclosure. As previously described, the bracket 803 has two stanchions 804, 805 extending distally from its ends. Each stanchion 804, 805 supports a corresponding pivot shaft 806, 807.

A pair of recessed passageways 813, 814 is defined by the upper surface of the bracket 803. In one or more embodiments, one or more rechargeable batteries (523) will be situated between the stanchions 804, 805. These rechargeable batteries (523) will situate atop the upper surface of the bracket 803 between the stanchions 804, 805. This pair of recessed passageways 813, 814 allows flexible conductors (506, 507) to pass beneath these one or more rechargeable batteries (523) to connect both the rechargeable batteries to each other and to provide an electrical connection pathway between the electronic circuit components (504, 505) that provide device functionality and allow for content to be presented to the flexible display that will be coupled to these flexible conductors (506, 507).

In this illustrative embodiment, one recessed passageway 813 is narrower than the other, although in other embodiments the recessed passageways 813, 814 can be the same size. In still other embodiments, the other recessed passageway 814 can be narrower than the first, and so forth.

Figure 16:
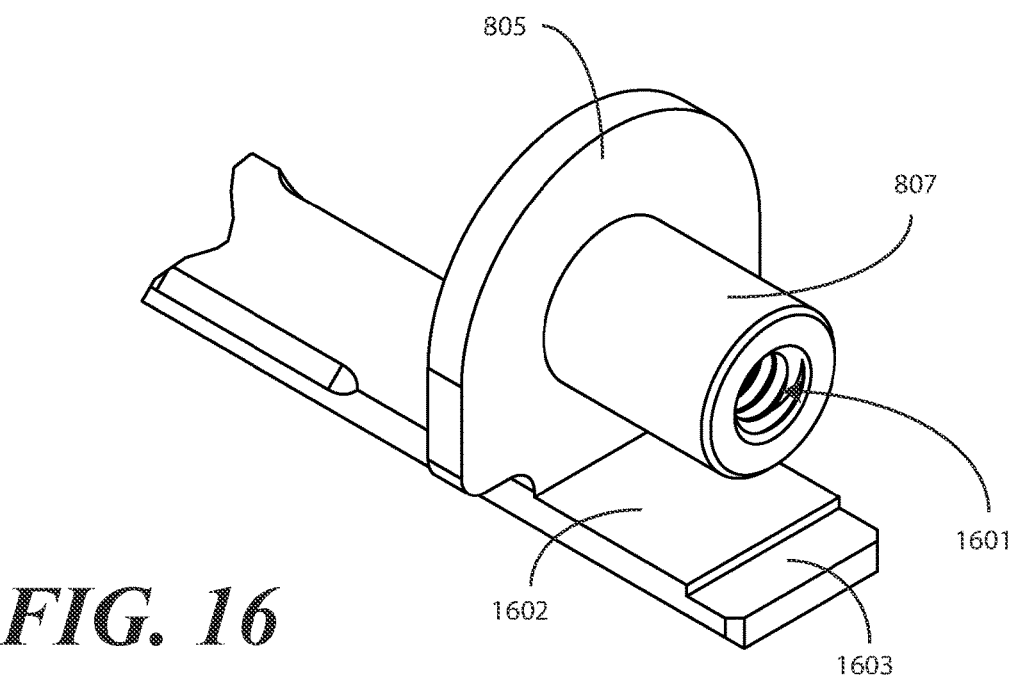
FIG. 16 illustrates yet another explanatory pivot shaft in accordance with one or more embodiments of the disclosure.

Turning now to FIG. 16, illustrated therein is stanchion 805 in more detail. As shown, the pivot shaft 807 extending distally from this stanchion defines a threaded central bore 1601. In one or more embodiments a screw can engage this threaded central bore 1601 to retain links engaging the pivot shaft 807 between the stanchion 805 and the corresponding screw head or a fastener cap situated between the links and the screw head.

Also shown in FIG. 16 is a stair-stepped mechanical stop comprising a first stop level 1602 and a second stop level 1603. In one or more embodiments these stops prevent the corresponding deformable electronic device from becoming over deformed in the deformed state or hyper extending beyond the substantially planar state.

Turning now to FIG. 17, illustrated therein is a top plan view of one explanatory link 1700 for a deformable electronic device in accordance with one or more embodiments of the disclosure. In this illustrative embodiment, the link comprises a laminate of a plurality of link layers 1701. In one or more embodiments, each link layer 1701 comprises a stainless-steel plate that is press-fit onto the pivot shaft to define the link 1700. In one or more embodiments, each link layer 1701 has a thickness of 0.3 millimeters.

In this illustrative embodiment, the laminate comprises five link layers, although more or fewer layers can be used in other embodiments. In one or more embodiments, the link layers are welded together. While welding is one way to join the five link layers together, in other embodiments the link layers are not attached to one another at all. They can be welded or attached together for ease of assembly, but functionally there is no need to attach them together at all. Where attachment is desired, the link layers are adhesively coupled together instead of welding. Other techniques for coupling the plurality of link layers 1701 together, where desired, will be obvious to those of ordinary skill in the art having the benefit of this disclosure.

Turning now to FIG. 18, illustrated therein is a side elevation view of the link 1700 of FIG. 17. In one or more embodiments, each link 1700 of the plurality of links (909) used in a deformable electronic device (100) defines a pivoting aperture 1801 within which a pivot shaft of the plurality of pivot shafts (801) can rotate without translation and a sliding aperture 1802 within which another pivot shaft of the plurality of pivot shafts (801) can both rotate and translate.

In this illustrative embodiment, the link 1700 also defines a compression slot 1803 that allows the link 1700 to slightly expand or contract in width. In one or more embodiments, a compression slot 1803, or some mechanical equivalent, is included to allow the link 1700 to be able to flex. One of the reasons including a compression slot 1803 is advantageous is that it overcomes designed nominal interference between the apertures in the link 1700 and the pivot shaft engaging the aperture. It is this designed interference that generates the friction, and it is the compression slot 1803 that allows the structure of the link 1700 to flex in response to this interference, thereby applying the frictional resistance. Thus, the designed interference causes an opening of the compression slot 1803, which results in a loading force being applied to the pivot shaft engaging the aperture. The designed interference condition can apply to both the pivoting apertures and the sliding apertures. Between the two sources of friction, namely, that between the pivoting apertures and the pivot shafts and that between the sliding aperture and the pivot shafts, the compression slot 803 allows a link bending required to overcome in the protuberances in the translating interfaces that dominates the retention forces in the system. In one or more embodiments, the designed tolerances result in the diameter of the pivoting aperture 1801 being slightly smaller than the outer diameter of a pivot shaft that engages the pivoting aperture 1801. As such, the compression slot 1803 expands slightly when the pivot shaft is inserted into the pivoting aperture 1801. This results in the compression slot 1803 causing the pivoting aperture 1801 to apply a loading force against the pivot shaft inserted therein, thereby increasing friction between pivoting aperture 1801 and the pivot shaft (801).

In one or more embodiments, the sliding aperture 1802 defines a curvilinear slot within which a pivot shaft inserted therein can both rotate and translate when the deformable electronic device in which the link 1700 is included deforms. In this illustrative embodiment, the curvilinear slot defines two partially circular edge portions 1804, 1805 that are separated by a first protuberance 1806 and a second protuberance 1807. While two protuberances 1806, 1807 are used in this illustrative embodiment, in other embodiments only a single protuberance will be included.

In one or more embodiments, each partially circular edge portion 1804, 1805 retains the pivot shaft inserted therein to one side or other of the protuberances 1806, 1807 until a lateral force sufficient to cause the pivot shaft to traverse the protuberances 1806, 1807 is applied to the pivot shaft toward a portion of the curvilinear slot unoccupied by the pivot shaft. Thus, if the pivot shaft initially abutting partially circular edge portion 1804, it will remain there until a lateral force is applied to the pivot shaft toward the other partially circular edge portion 1805 with a sufficient magnitude as to cause the pivot shaft to traverse the protuberances 1806, 1807 by causing the compression slot 1803 to slightly expand.

Turning now to FIG. 19, illustrated therein is another partially assembled deformable electronic device assembly in accordance with one or more embodiments of the disclosure. As shown, the inner group 901 of links and outer group 904 of links has been placed on the plurality of pivot shafts (801) in an overlapping, interleaved configuration such that pivot shafts engaging sliding apertures of the inner group 901 of links and the outer group 904 of links are able to translate from a first position within those sliding aperture to a second position within the sliding apertures when the assembly transitions from a flat configuration to a convex bent configuration.

Figure 20:
FIG. 20 illustrates one explanatory fastener cap in accordance with one or more embodiments of the disclosure.
Figure 21:
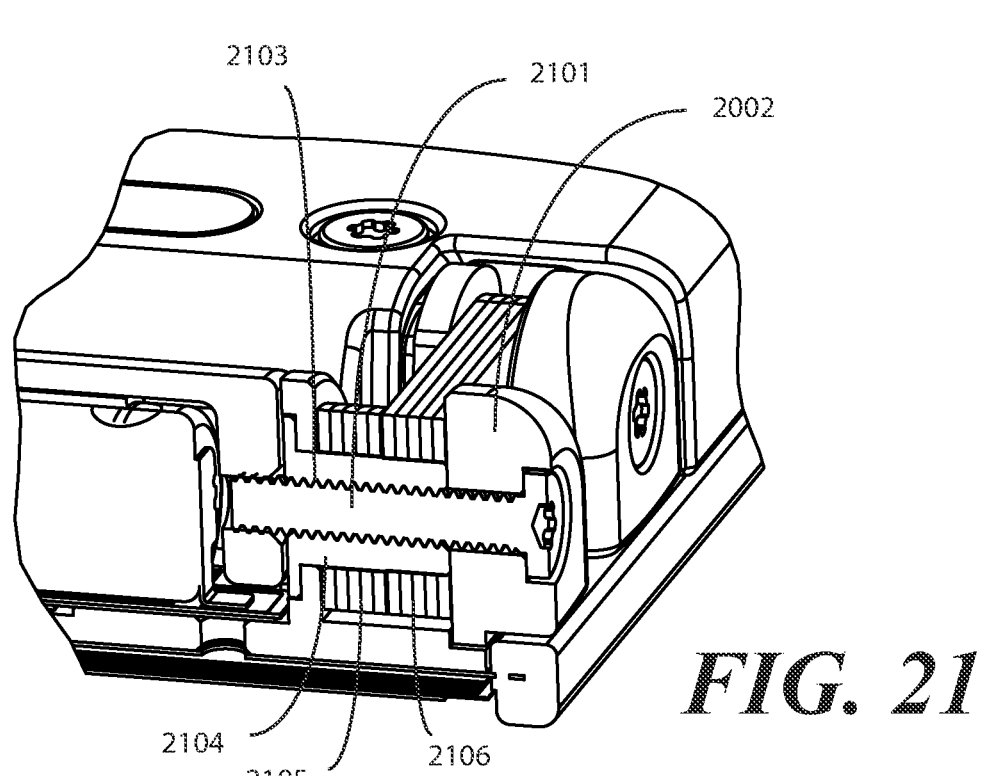
FIG. 21 illustrates a partial, sectional view of one explanatory deformable electronic device in accordance with one or more embodiments of the disclosure.

Thereafter, a plurality of screws 1901 each pass through a fastener cap of a plurality of fastener caps 1902 to engage the threaded bore of each pivot shaft of the plurality of pivot shafts (801) to retain the inner group 901 of links and the outer group 904 of links around each pivot shaft of the plurality of pivot shafts (801). FIG. 20 illustrates a left fastener cap 2001 and a right fastener cap 2002, while FIG. 21 illustrates a screw 2101 passing through the right fastener cap 2002 and engaging the threaded bore 2103 of a pivot shaft 2104 to retain an inner link 2105 and an outer links 2106 to the pivot shaft 2104. Once all the screws are in place, the resulting partially assembled assembly 2200 is shown in FIG. 22.

Figures 22, 23:
FIG. 22 illustrates a fourth partial deformable electronic device assembly in accordance with one or more embodiments of the disclosure.
FIG. 23 illustrates a fifth partial deformable electronic device assembly in accordance with one or more embodiments of the disclosure.

Turning now to FIG. 23, the one or more rechargeable batteries 523 have been situated between pairs of stanchions atop the corresponding brackets from which those stanchions extend. Additionally, the electronic circuit components 504, 505 have been positioned atop end bracket (808) and end bracket (809).

In this illustrative embodiment, a pair of rechargeable batteries 523 is positioned between each pair of stanchions. The electronic circuit components 504, 505 are coupled to the rechargeable batteries 523. Each rechargeable battery 523 comprises a rechargeable electrochemical cell. In some embodiments, the rechargeable electrochemical cells are surrounded by a sheath.

In one or more embodiments, the rechargeable electrochemical cells include a positive electrode (cathode), a negative electrode (anode), and a separator that prevents these two electrodes from touching. While a separator electrically separates the cathode and anode, the separator permits ions to pass through.

In one or more embodiments, a separator having a top and bottom is placed atop an electrode. Disposed on the top of the separator is a first layer of an electrochemically active material. For example, the first layer may be lithium or a lithium intercalation material if the rechargeable electrochemical cells are lithium ion or lithium polymer cells.

Disposed atop first layer is a current collecting layer. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collection layer is a second layer of electrochemically active material.

The rechargeable electrochemical cells store and deliver energy to the electronic circuit components 504, 505 by transferring ions between electrodes through a separator. For example, during discharge, an electrochemical reaction occurs between electrodes. This electrochemical reaction results in ion transfer through the separator, which causes electrons to collect at the negative terminal of the cell. When connected to a load, such as the electronic circuit components 504, 505, the electrons flow from the negative pole through the circuitry in the load to the positive terminal of the cell. This is shown in conventional circuit diagrams as current flowing from the cathode to the anode. When the rechargeable electrochemical cells are charged, the opposite process occurs.

This electrode construct can then be stacked. Once stacked, the electrode stack can be rolled into a "jellyroll" configuration so that the same can be placed in a cylindrical can that defines the exterior surface of the rechargeable electrochemical cell. Illustrating by example, two electrodes constructed as described above can be stacked, with one electrode fabricated with a layer of active electrode material, such as an electrochemically active negative electrode material, while the other electrode is fabricated with a layer of electrochemically active positive electrode material.

A first tab can be coupled to one electrode, while a second tab is coupled to the other electrode. These tabs can be coupled to the current collectors of each electrode.

In one or more embodiments, the electrodes are arranged in stacked relationship, with the tabs being disposed on opposite edges of the stack. Thereafter, the stack is rolled into a roll, sometimes referred to as a "jellyroll," for a subsequent insertion into an electrochemical cell housing such as the cylindrical cans shown in FIG. 23.

The cylindrical cans can each be a metal can or a plastic can. They can also be a flexible pouch, such as would be the case where the electrode assembly was a prismatic electrode assembly. Where metal or plastic, the housing can be configured to be cylindrical such that the rechargeable electrochemical cells can situated between each pair of stanchions. However, in other constructs the rechargeable electrochemical cell can be rectangular or ovular in cross section.

For the rechargeable electrochemical cells, the cylindrical cans can be sealed in a variety of ways. In one illustrative embodiment, the cylindrical cans can be sealed by a lid defining each end of the cylindrical can. The lids, which can be manufactured from metal, are connected to the internal tabs and serve as one electrical terminal of the rechargeable electrochemical cells. An insulator can be provided to isolate the lid from the other tab. The second tab can be the coupled to another location, be it the left end, the outer, concentrically aligned external electrode, or the second external electrode. In other embodiments, such as when the cylindrical cans are manufactured from aluminum, the cylindrical can itself can be connected to the cathode. Conversely, where the cylindrical can is manufactured from steel, it will be connected to the anode.

In alternate embodiments, the tabs can be connected to a terminal block rather than to the lid and housing. The end of each energy storage device of the plurality of rechargeable batteries 523 could comprise a terminal block, for example. The terminal block, where employed, provides a convenient way for both the positive terminal and negative terminal to reside on a common end of the energy storage device.

Figure 24:
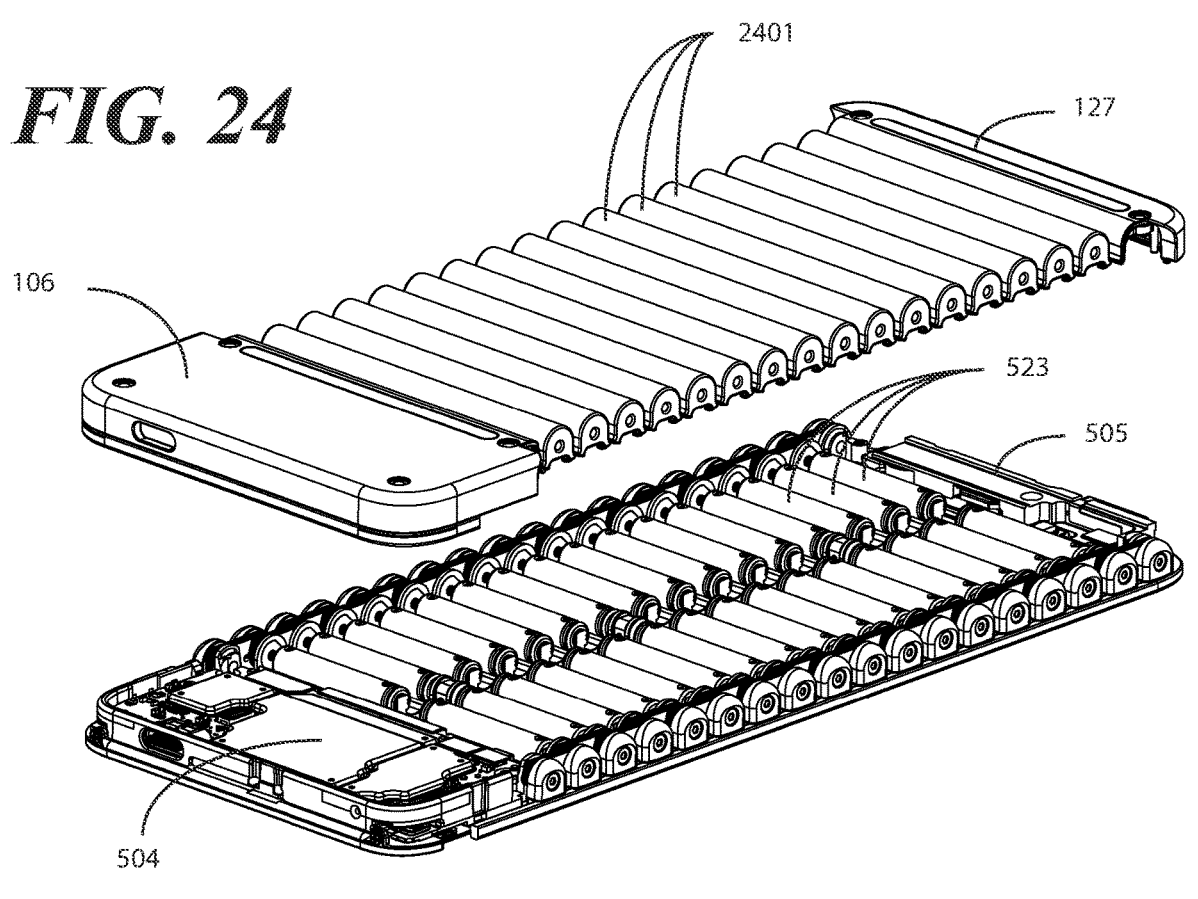
FIG. 24 illustrates an exploded view of a sixth partial deformable electronic device assembly in accordance with one or more embodiments of the disclosure.

Turning now to FIG. 24, in one or more embodiments a plurality of covers 2401 then covers the plurality of rechargeable batteries 523. In one or more embodiments, each cover of the plurality of covers 2401 is physically separated from the other. Accordingly, each cover of the plurality of covers 2401 covers the one or more rechargeable batteries 523 situated between the pairs of stanchions by situating atop a corresponding bracket to cover a pair of rechargeable batteries without touching a neighboring cover when the assembly is in the substantially planar state. As shown, the electronic circuit component housing 106 covers electronic circuit components 504, while the other electronic circuit component housing 127 covers electronic circuit components 505. The resulting assembly 2500 is shown in FIG. 25.

Figure 26:
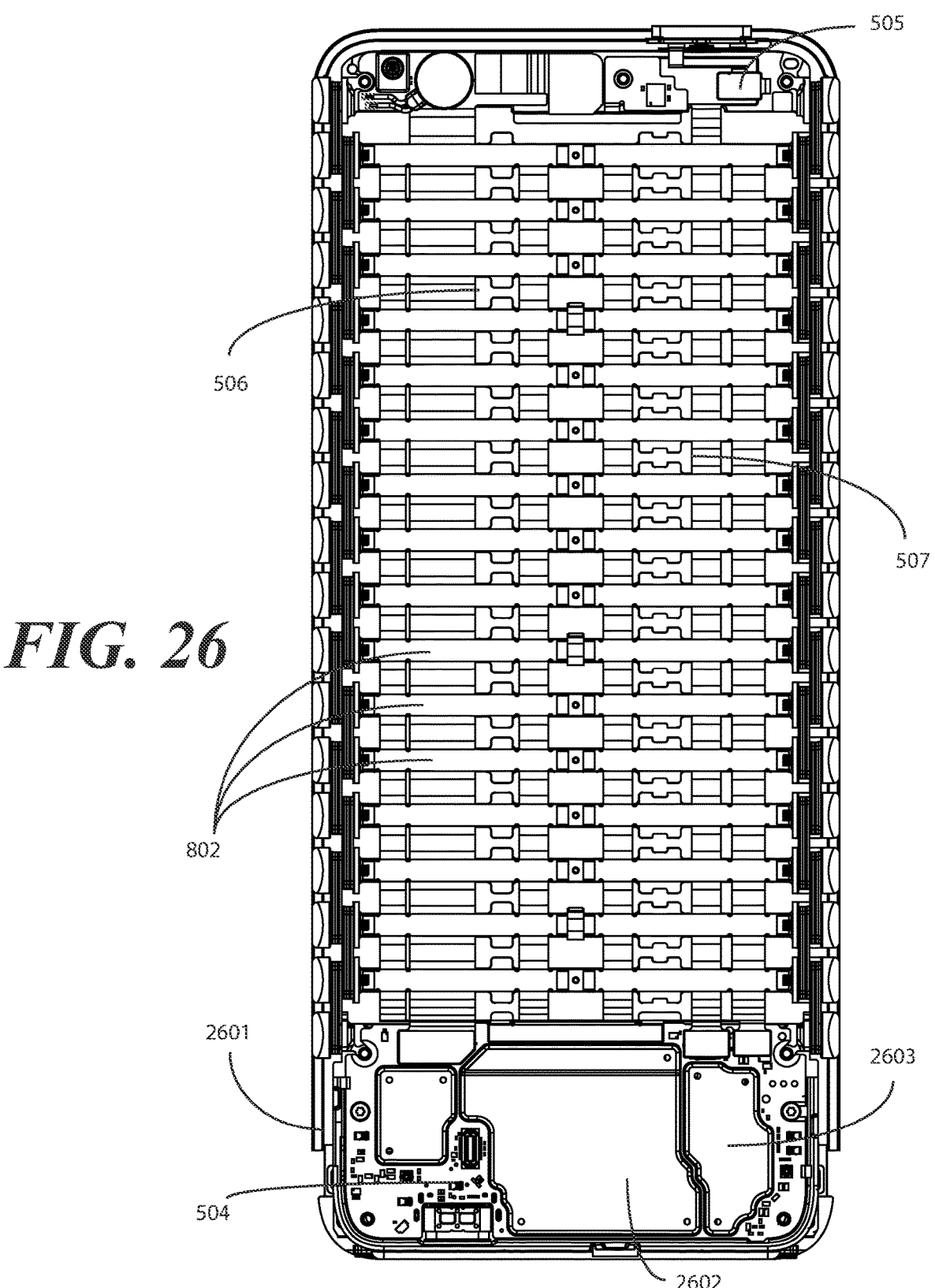
FIG. 26 illustrates an eighth partial deformable electronic device assembly in accordance with one or more embodiments of the disclosure.

Turning now to FIG. 26, illustrated therein is a plan view of the partial assembly of FIG. 23 with the one or more rechargeable batteries (523) removed. Recall from above that in one or more embodiments one or more embodiments electronic circuit components 504, 505 are electrically coupled between the one or more rechargeable batteries (523) and the flexible display (502) by conductors 506, 507 or a bus passing along the one or more rechargeable batteries 523. FIG. 26 illustrates how the conductors 506, 507 pass across the recessed passageways (813, 814) of each bracket of the plurality of brackets 802 to couple the electronic circuit components 504, 505 together.

Figure 25:
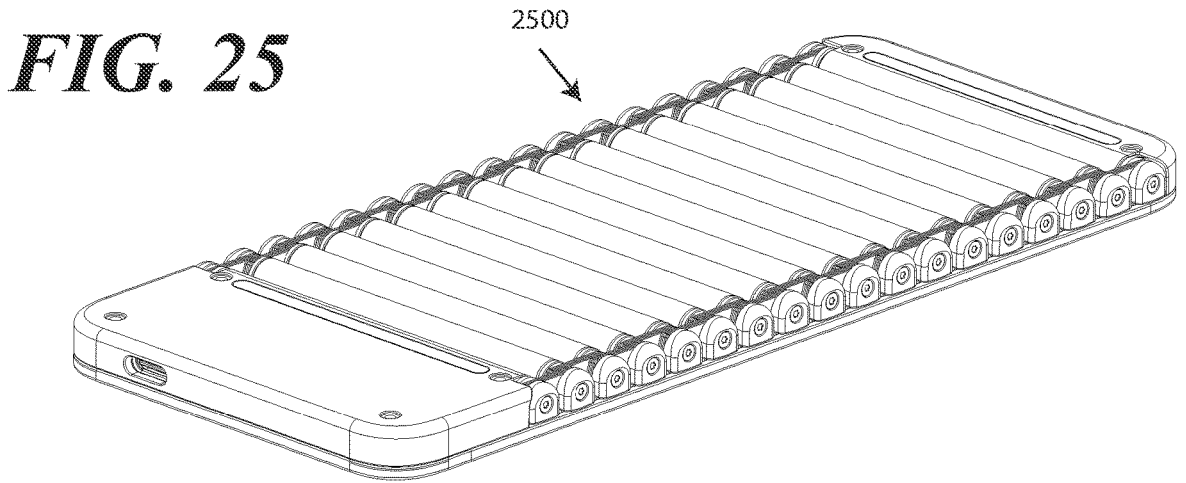
FIG. 25 illustrates a seventh partial deformable electronic device assembly in accordance with one or more embodiments of the disclosure.

In this illustrative embodiment, the conductors 506, 507 comprise a flexible substrate spanning the deformable link assembly 101 to electrically couple the electronic circuit components 504 that were situated in the electronic circuit component housing (106) in FIG. 25 to other electronic circuit components 505 that were situated within another electronic circuit component housing (127) in FIG. 25. In one or more embodiments, one or more embodiments shields 2601, 2602, 2603 can be placed atop certain electronic circuit components to ensure electromagnetic interference (EMI) does not interfere with their operation or the operations of other components of the deformable electronic device.

Figure 27:
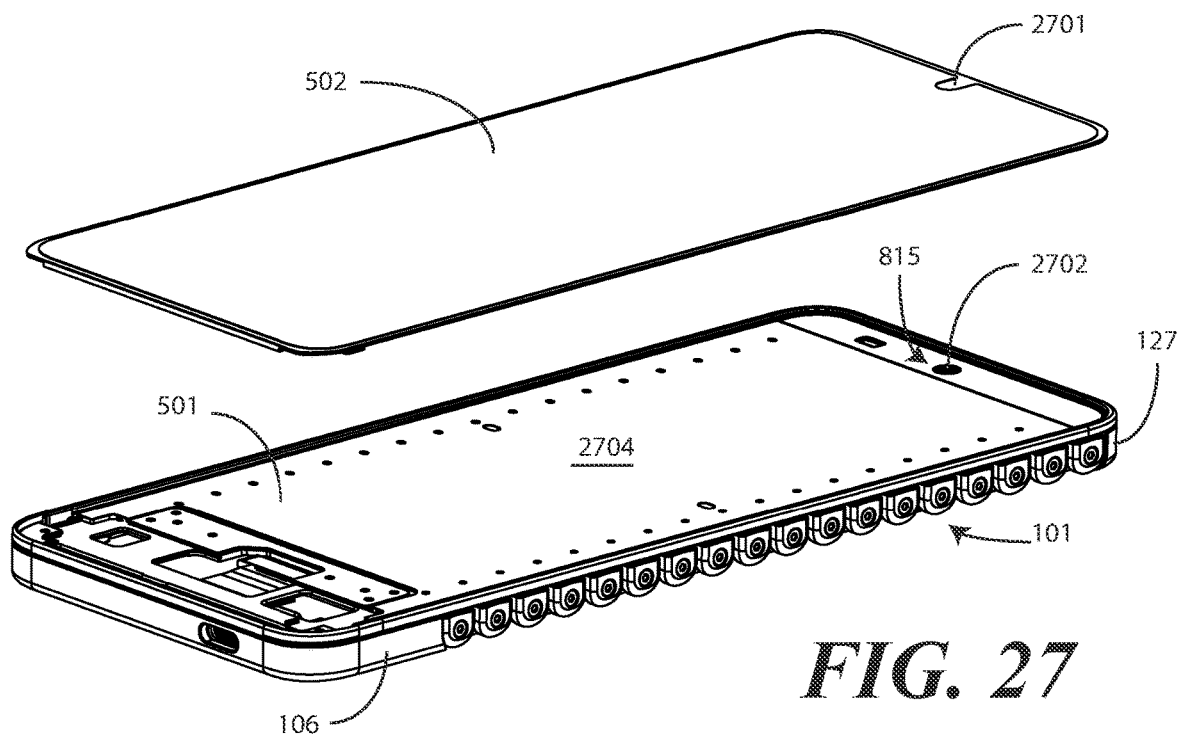
FIG. 27 illustrates an exploded view of a ninth partial deformable electronic device assembly in accordance with one or more embodiments of the disclosure.

Turning now to FIG. 27, once the deformable link assembly 101 has been fully assembled the flexible display 502 can be attached to the flexible substrate 501 such that the flexible display 502 abuts a major surface 2704 of the flexible substrate on an opposite side of the flexible substrate 501 relative to the plurality of brackets (802). In one or more embodiments, this attachment of the flexible display 502 to the flexible substrate 501 occurs before the one or more rechargeable batteries (523) are installed and before the one or more covers (2401) are placed atop the one or more rechargeable batteries. In one or more embodiments, the electronic circuit component housing 106 and the other electronic circuit component housing 127 can be installed atop the electronic circuit components (504, 505) before the flexible display 502 is attached to the flexible substrate 501, as shown in FIG. 27. In other embodiments, these housings can be coupled top the electronic circuit components (504, 505) after.

Figure 28:
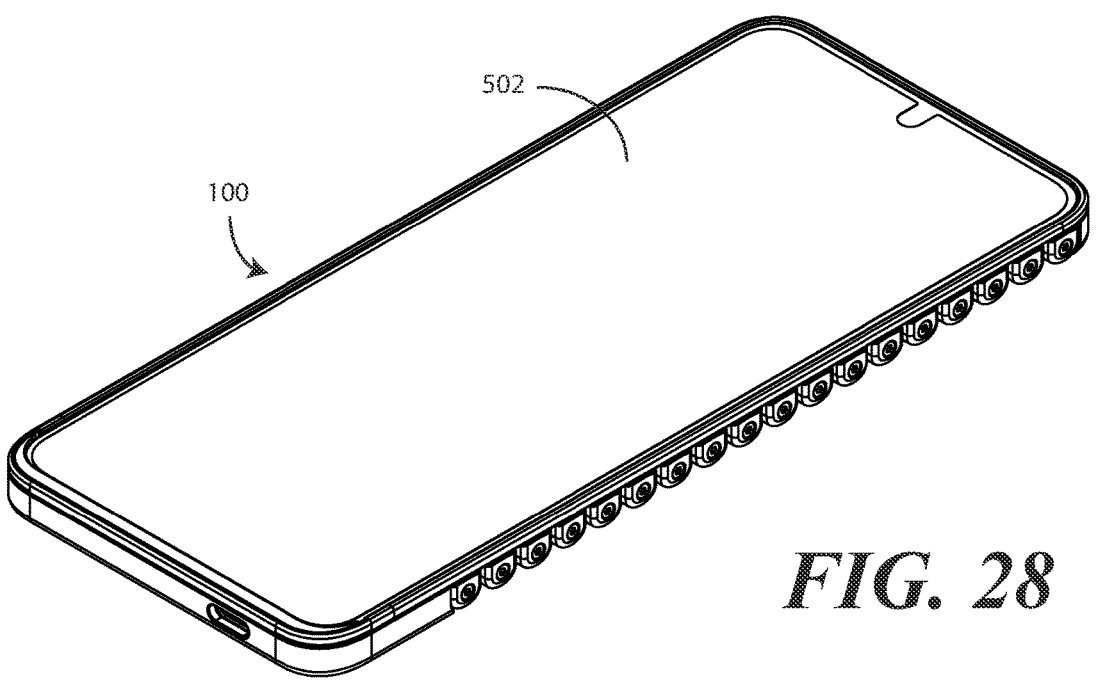
FIG. 28 illustrates a perspective view of one explanatory deformable electronic device in accordance with one or more embodiments of the disclosure.

In this illustrative embodiment, the flexible display 502 includes a peninsular indention 2701 that allows an image capture device 2702 situated within an aperture 815 defined by the flexible substrate to have a field of view through the substrate supporting the active display material of the flexible display 502. The completed deformable electronic device 100 is shown in FIG. 28, with the flexible display 502 spanning substantially all the front major surface of the deformable electronic device 100.

Figure 29:
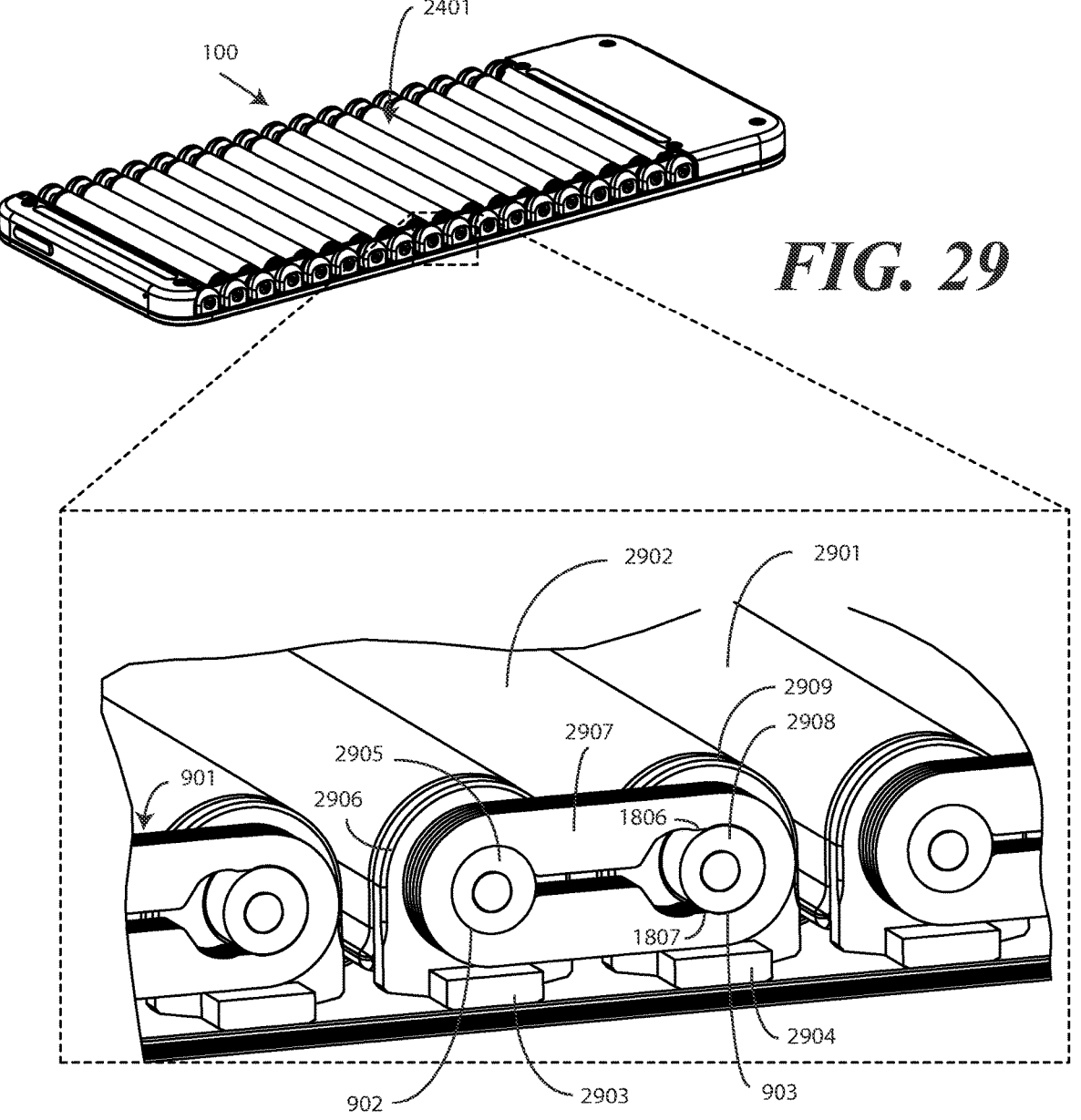
FIG. 29 illustrates a partial view of one explanatory link assembly for a deformable electronic device when the deformable electronic device is in a substantially planar state.

Attention will now be turned to the operation of the links as the deformable electronic device 100 deforms. Turning now to FIG. 29, illustrated therein is the fully assembled deformable electronic device 100 turned over. In this rear perspective view the plurality of covers 2401 can be seen. A cross section between the inner links and the outer links is shown in the inset. For ease of illustration, this view only shows the inner links and does not show the outer links at all.

The plurality of screws (509) and the fastener caps (2002) have been removed, each cover, e.g., cover 2901, of the plurality of covers 2401 covers the one or more rechargeable batteries (523) situated between the pairs of stanchions and atop the corresponding bracket without touching a neighboring cover, e.g., cover 2902, when the deformable electronic device 100 is in the substantially planar state.

Figure 33:
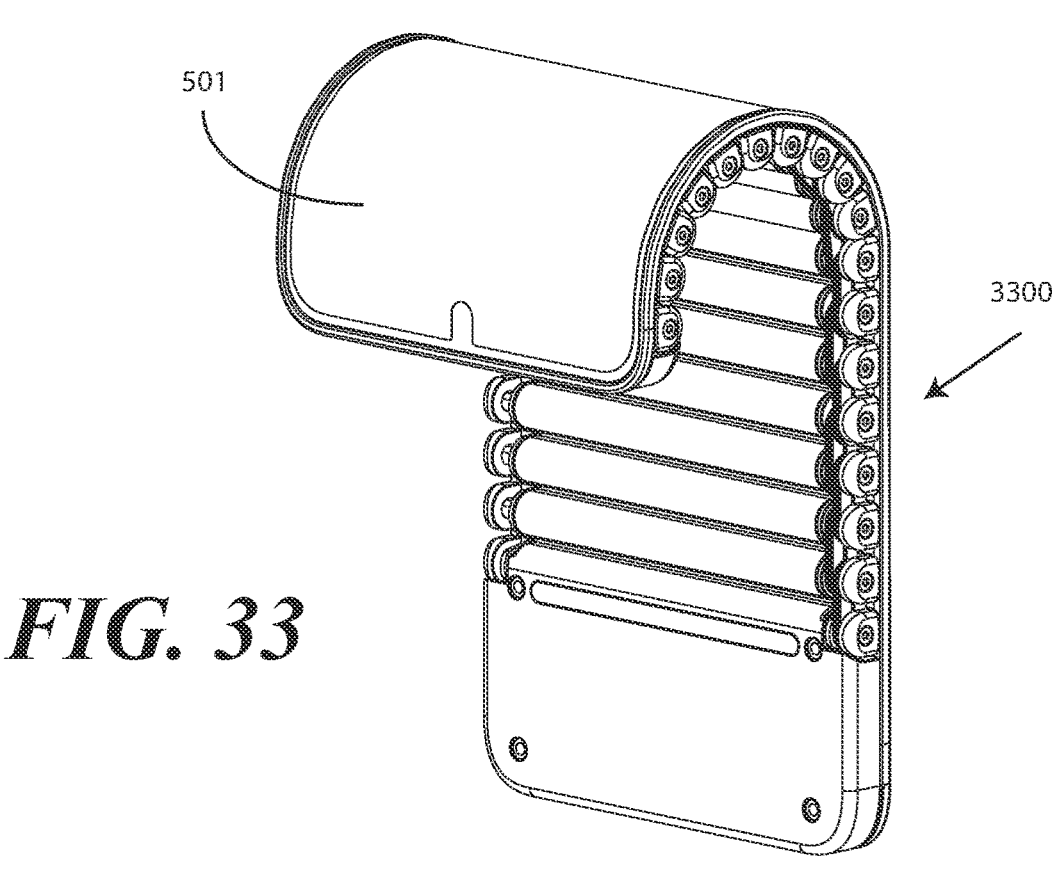
FIGS. 33 and 34 illustrate one explanatory deformable electronic device in a deformed state in accordance with one or more embodiments of the disclosure.
Figure 34:
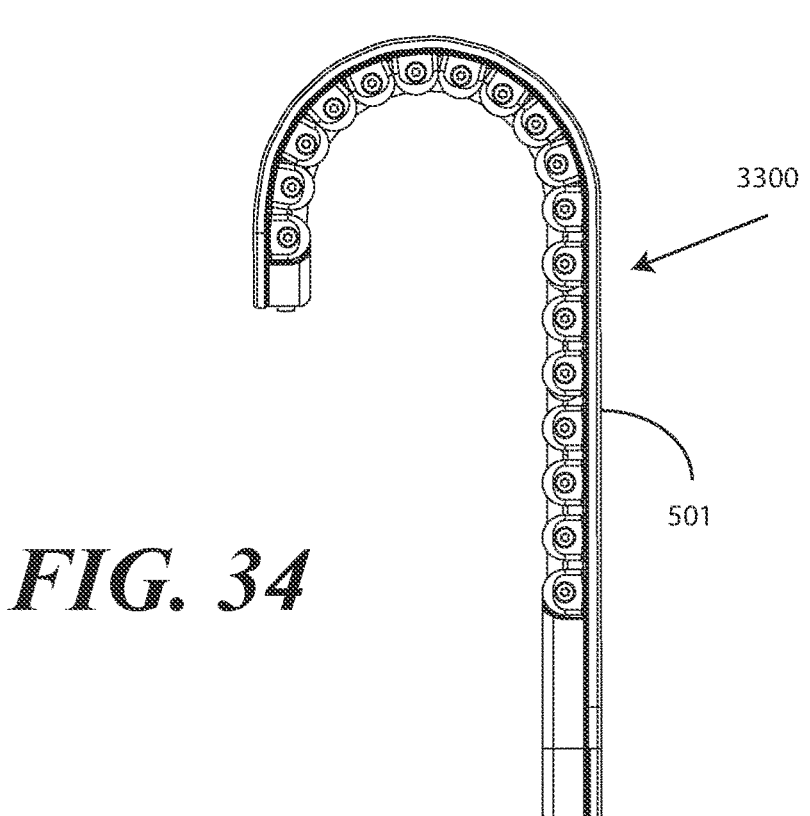

As also shown in the expanded view, each stanchion comprises a mechanical stop 2903, 2904 extending beneath one or more of the inner group of links 901 and/or the outer group of links (904). In one or more embodiments, each mechanical stop 2903, 2904 is configured to interfere with links of one or more of the inner group of links 901 and/or the outer group of links (904) to prevent the deformable electronic device 100 from "hyper extending" beyond the substantially planar state shown in FIG. 29 where the flexible display (502) transitions to a concave bent configuration. In this illustrative embodiment, the outer group of links (904) situates against the mechanical stops 2903, 2904 to prevent this action because the deformable electronic device 100 is only configured to transition between states where the flexible display (502) is substantially planar and where the flexible display (502) bends in a convex manner as the deformable link assembly bends together on the rear side of the deformable electronic device. One such example of a deformable state 3300 where the flexible display 502 is shown in a convex deformed state is shown in FIGS. 33-34.

Figure 31:
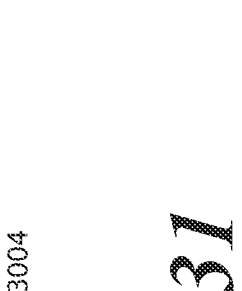
FIG. 31 illustrates another partial view of the explanatory link assembly of FIG. 29 when the corresponding deformable electronic device is in a substantially planar state.

It should be noted that for ease of illustration, in FIG. 29 the mechanical stops 2903, 2904 are shown as single-step mechanical stops and the inner group of links 901 have been removed so that the non-touching feature of the plurality of covers 2401 can be seen. However, in other embodiments the inner group of links 901 will be alternatingly interleaved with the outer group of links (904) and the mechanical stops 2903, 2904 will be the double-stair stepped stops described above with reference to FIGS. 11, 14, and 16. This construction is shown in FIG. 31, where the inner group of links 901 and the outer group of links 904 are both shown, with the mechanical stops 3003, 3004 being double-stair-steps. Where the stops 3003, 3004 are the double-stair-step stops, the thicker region of these stops 3003, 3004 serves as a stop for the links to prevent the electronic device 100 from bending into a concave shape. The outermost and thinner section of these mechanical stops 3003, 3004 serves as a keying and alignment feature for the fastener caps (2001, 2002). This feature mates into corresponding notch feature on the bottom edge of the fastener caps (2001, 2002), thereby preventing the fastener caps (2001, 2002) from twisting when the retention screws are installed.

Referring again to FIG. 29, the removal of the inner group of links (901) also simplifies the initial discussion of how the links operate in the deformable electronic device 100. In FIG. 29, the deformable electronic device 100 is in the substantially planar state. Accordingly, a pivot shaft 2905 extending from a first stanchion 2906 engages the pivoting aperture 902 of a link 2907, while a neighboring pivot shaft 2908 extending from a neighboring stanchion 2909 engages the sliding aperture 903 of the link 2907. More specifically, when the deformable electronic device 100 is in the substantially planar state the pivot shaft 2908 engaging the sliding aperture 903 situates at a first position within the sliding aperture 903 that is farther from the pivoting aperture 902 than is a second position separated from the first position by at least one protuberance 1806, 1807.

As will be shown in FIG. 30 below, in one or more embodiments the pivot shaft 2905 engaging the pivoting aperture 902 pivots within the link 2907 when the deformable electronic device 100 deforms from the substantially planar state, while the pivot shaft 2908 engaging the sliding aperture 903 translates linearly from the first position within the sliding aperture 903 to a second position within the sliding aperture 903 that is different from the first position when the deformable electronic device 100 deforms to a deformed state. As shown in FIG. 29, the first position within the sliding aperture 903 is farther from the pivoting aperture 902 than the second position within the sliding aperture 903.

Figure 30:
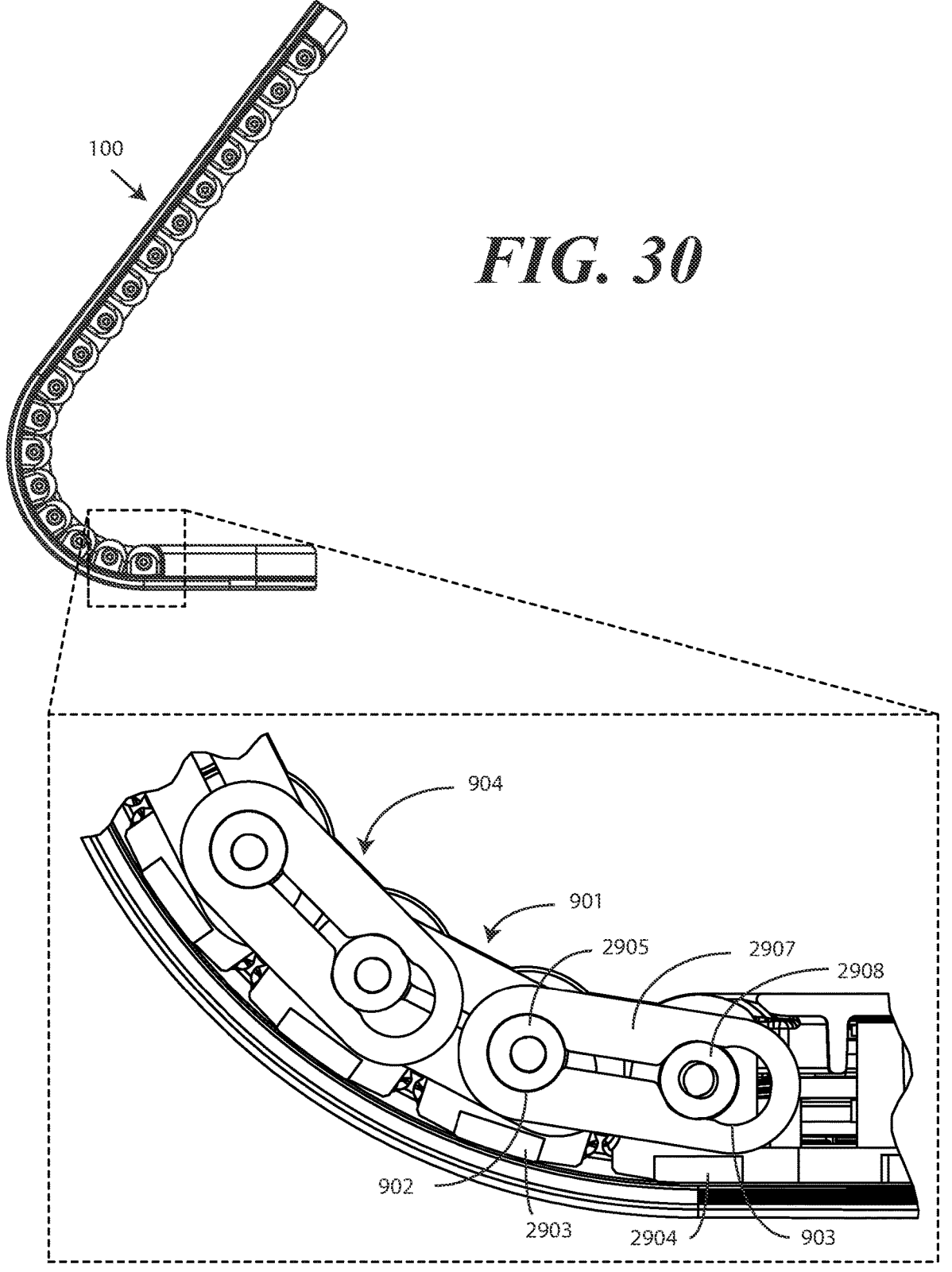
FIG. 30 illustrates a partial view of the explanatory link assembly of FIG. 29 when the deformable electronic device is in a deformed state.

Turning now to FIG. 30, the deformable electronic device 100 has been transitioned from the substantially planar state of FIG. 29 to a deformed state. In one or more embodiments, when the deformable electronic device 100 is deformed, the flexible substrate (501) flexes and adjacent brackets of the plurality of brackets (802) tilt toward each other. Each link, e.g., link 2907, rotates about one pivot shaft 2905. Each link 2907 also both rotates and translates over the adjacent pivot shaft, e.g., pivot shaft 2908.

In one or more embodiments, the maximum amount of rotation is about twenty degrees for each pivot shaft situated within each pivoting aperture. For the deformable electronic device 100 of FIG. 30, in one or more embodiments when the deformable electronic device is bent as tightly as the structure allows, the flexible display bends between each welded bracket. Each bracket bends to approximately twenty degrees in angle relative to its adjacent brackets. Each link rotates around one pivot shaft and rotates and translates on the other pivot shaft it engages. The friction provided by compression slot of the links on the pivot shafts securely retains the bent shape of the deformable electronic device until the user bends it into a different shape.

The compression slot creates rotational and/or torsional resistance against the pivot shaft 2905 about which the link 2907 rotates, and both rotational and translational resistance on the pivot shaft 2908 about which the link 2907 both rotates and translates. The friction created by these resistive forces work to retain the deformable electronic device 100 in the shape into which is has been deformed.

As shown, the pivot shaft 2905 engaging the pivoting aperture 902 has rotated within the link 2907. At the same time, the pivot shaft 2908 engaging the sliding aperture 903 has translated linearly from the first position within the sliding aperture 903 that is farther from the pivoting aperture 902 to a second position within the sliding aperture 903 that is closer to the pivoting aperture 902. Stops 2903, 2904 only engage the links the substantially planar state and help to prevent the device from hyperextending beyond flat into a concave shape of the display. Other features prevent the device from bending further in the fully bent state. For example, the pivot shaft stops against the end of the sliding aperture in the link, preventing any further travel. Also, adjacent stanchions effectively stop against each other, as do adjacent housings, and the max bend state. As such, these components help to prevent hyper extension causing the flexible display (502) to become deformed with a concave contour.

Figure 32:
FIG. 32 illustrates another partial view of the explanatory link assembly of FIG. 29 when the corresponding deformable electronic device is in a deformed state.

Operation of the inner group of links 901 and the outer group of links 904 is shown in even greater detail in FIG. 32, where only one inner link 3201 and one outer link 3202 are shown for simplicity.

Figures 35, 36:
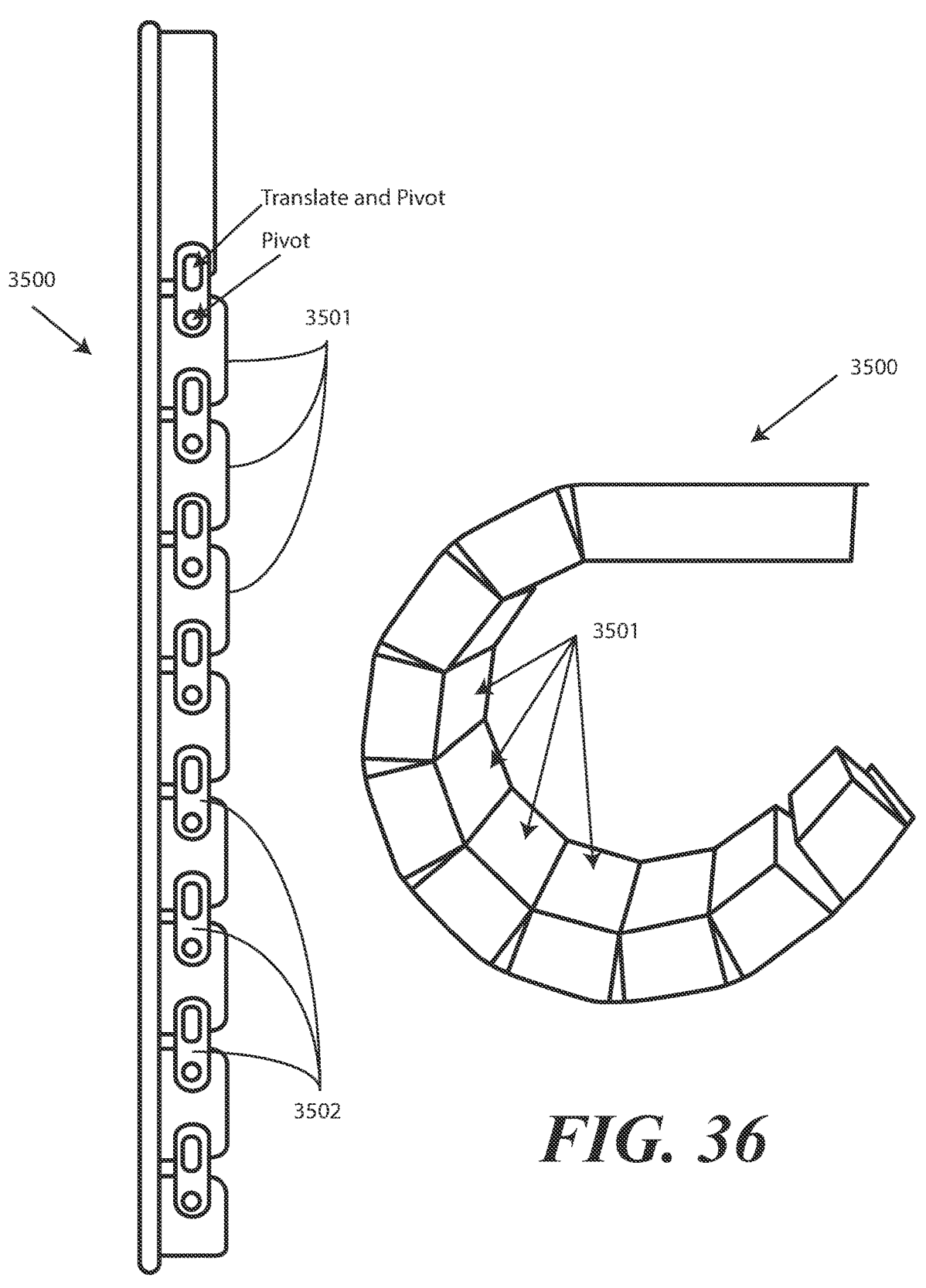
FIG. 35 illustrates another explanatory deformable electronic device in accordance with one or more embodiments of the disclosure when that deformable electronic device is in a substantially planar state.
FIG. 36 illustrates still another deformable electronic device in accordance with one or more embodiments of the disclosure when that deformable electronic device is in a deformed state.

Turning now to FIGS. 35-36, illustrated therein is an alternate deformable electronic device 3500 illustrating just how dynamic variations of embodiments of the disclosure can be extended for a given application. In the embodiments above, the covers covering the rechargeable batteries were physically separated when the deformable electronic device was in the substantially planar state. Moreover, mechanical stops interacting with links worked to both preclude hyper-extension of the deformable electronic device causing the flexible display to take a concave shape and excessive deformation when the flexible display is in the convex deformed state. What's more, both an inner group of links and an outer group of links were used to ensure consistent deformation occurs between adjacent pivot shafts.

The deformable electronic device 3500 of FIG. 35 takes an alternate approach to ensuring undesired deformation actions do not happen. In the embodiment of FIGS. 35-36, the covers 3501 covering the rechargeable batteries are wider than the links 3502 and are substantially rectangular in shape. This allows, for example, prismatic rechargeable batteries that take shapes that are other than cylindrical shapes to be used. Moreover, as shown in FIG. 35 the tension the links 3502 apply to the covers 3501 prevents hyperextension, while the width of the covers 3501 themselves prevents over deformation in the opposite direction as shown in FIG. 36.

Another benefit of the embodiment of FIGS. 35-36 is that interleaved rows of inner and outer links are unnecessary. Because the covers 3501 are wider in this embodiment, only one row of links, each that has a pivoting aperture and a sliding aperture as shown, is required. Each bracket stanchion would have not just one, but two, pivot shafts. In this case, each pivot shaft would engage with only one link, not two (inner and outer) links. Eliminating the need to interleave inner and outer rows of links provides effectively increased space available within the width of the device for batteries and other electronic components. This is just one example of how embodiments of the disclosure can be varied to achieve novel and non-obvious operational modes. Others will be obvious to those of ordinary skill in the art having the benefit of this disclosure.

Figure 39:
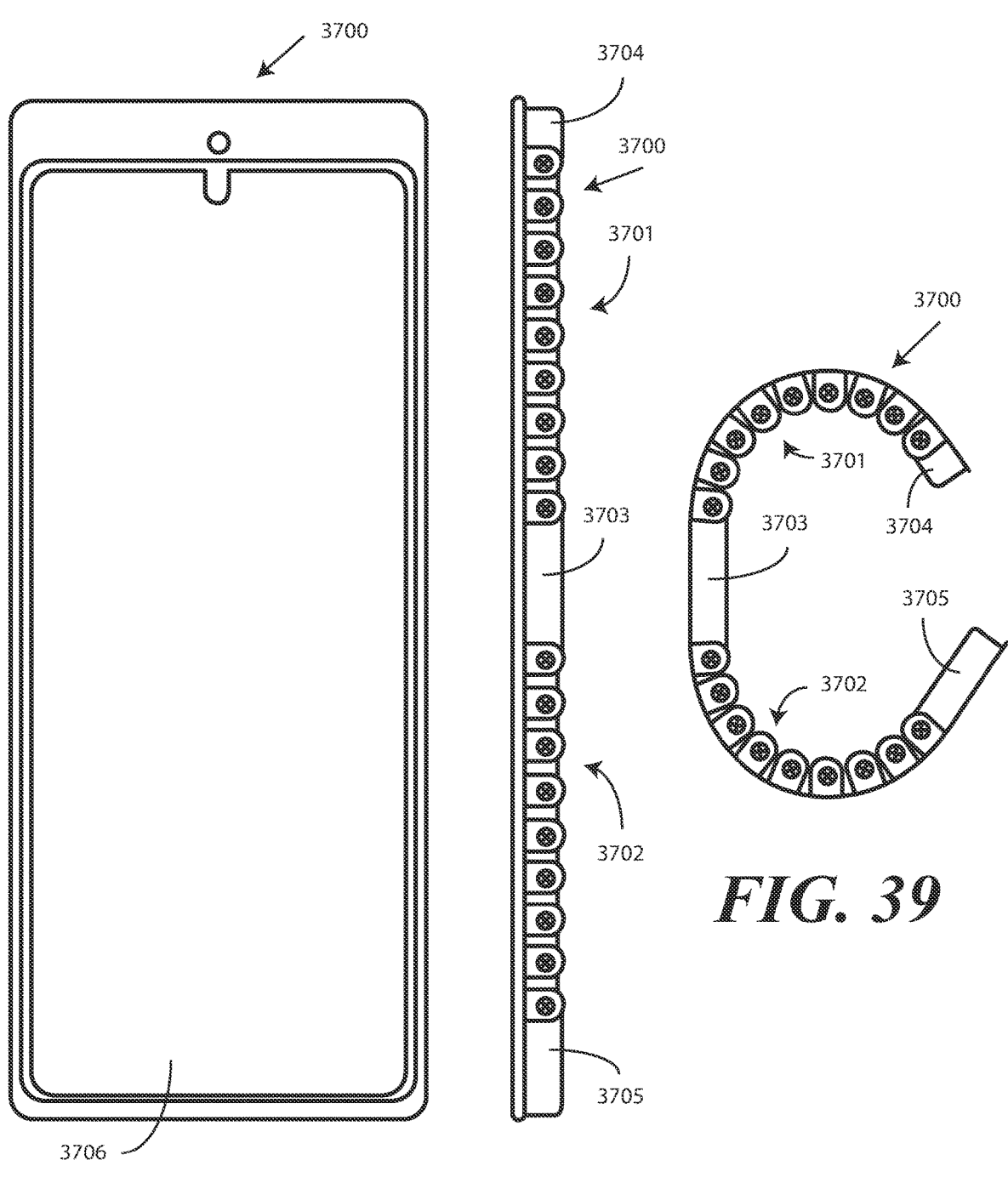
FIG. 39 illustrates a side view of the deformable electronic device of FIG. 37 after being transitioned to a deformed state.

To illustrate by example, and turning now to FIGS. 37-39, illustrated therein is still another deformable electronic device 3700 configured in accordance with one or more embodiments of the disclosure. While the deformable electronic device (100) of FIGS. 1-34 included electronic circuit components (504, 505) situated at the end of the deformable electronic device (100), with a plurality of pairs of stanchions extending from opposite sides of the flexible substrate (501) with each pair of stanchions supporting a pair of pivot shafts and being situated between the electronic circuit components (504, 505), the deformable electronic device 3700 of FIGS. 37-39 allows for additional electronic circuit components to be added and/or for the electronic circuit components to be moved to different locations.

In the illustrative embodiment of FIGS. 37-39, a flexible substrate supports two pluralities of pivot shaft 3701, 3702 that are separated by an electronics circuit housing 3703 situated at a central portion of the deformable electronic device 3700. Additional electronic circuit components can be satiated in the electronics circuit housing 3703. End electronic circuit housings 3704, 3705 can be included to house electronic circuit components as well.

As before, a plurality of links can interconnect the pivot shafts. Each link can define a pivoting aperture within which a pivot shaft of the pluralities of pivot shafts 3701, 3702 can rotate and a sliding aperture which another, adjacent pivot shaft of the pluralities of pivot shafts 3701, 3702 can both rotate and translate. Each pivot shaft of the pluralities of pivot shafts 3701, 3702 can engage the pivoting aperture of one link and the pivot shaft of another link as previously described. When the deformable electronic device 3700 deforms from the substantially planar state of FIGS. 37-38 to the deformed state of FIG. 39, each pivot shaft engaging a pivoting aperture can rotate while each pivot shaft engaging a sliding aperture can both rotate and translate linearly from a first position to a second position. The addition of the electronics circuit housing 3703 at the center of the device has the added benefit of keeping the central portion of the flexible display 3706 substantially flat, resembling the face of a watch, when the deformable electronic device 3700 is transitioned to the wrist-wearable deformed state of FIG. 39.

Figure 40:
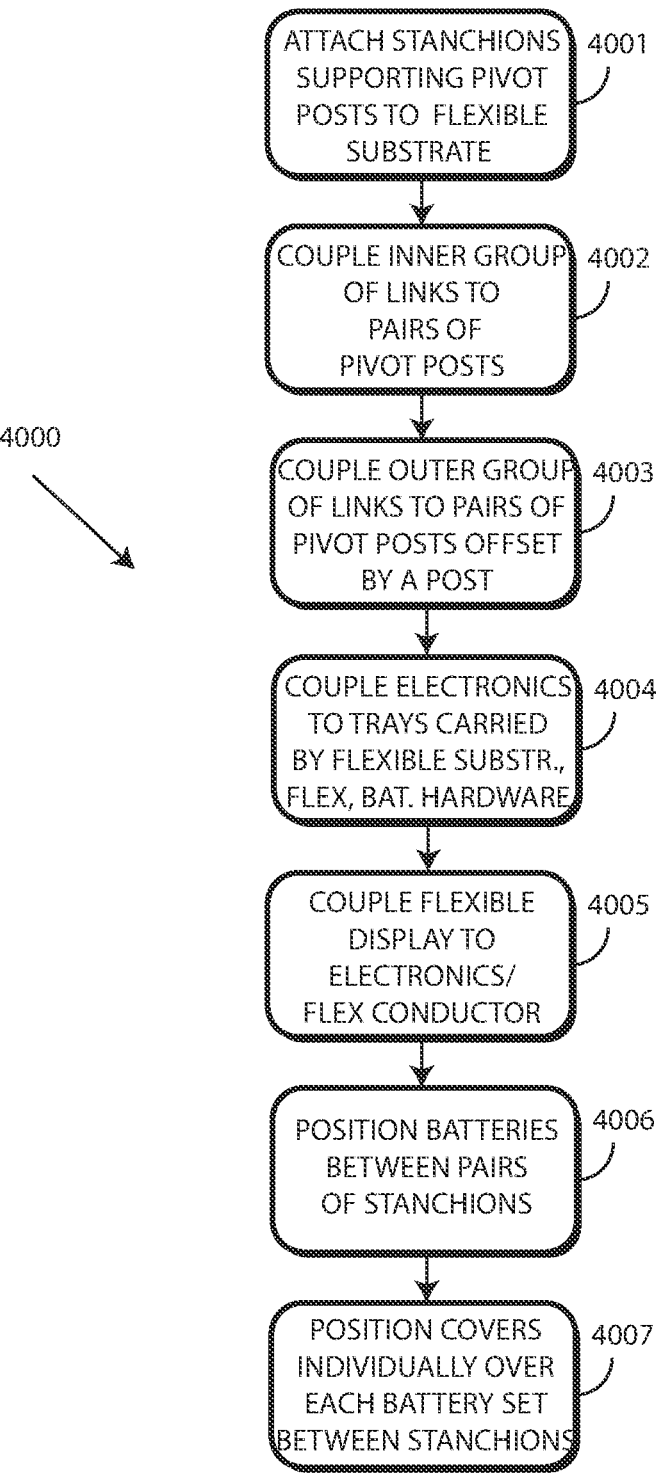
FIG. 40 illustrates one explanatory method in accordance with one or more embodiments of the disclosure.

Turning now to FIG. 40, illustrated therein is one explanatory method 4000 of manufacturing a deformable electronic device in accordance with one or more embodiments of the disclosure. Beginning at step 4001, the method 4000 comprises attaching a plurality of stanchions supporting a plurality of pivot shaft extending distally therefrom to a flexible substrate. In one or more embodiments, this step 4001 comprises attaching the stanchions to ends of a bracket and laser welding the brackets to the flexible substrate. In other embodiments where the brackets and stanchions are constructed as a unitary part, step 4001 can comprise bending ends of the brackets to define the stanchions, attaching the pivot shafts thereto, and then laser welding the brackets to the flexible substrate. Other techniques for attaching the stanchions supporting the pivot shafts extending distally therefrom the first major surface of the flexible substrate will be obvious to those of ordinary skill in the art having the benefit of this disclosure. Illustrating by example, the brackets and stanchions can be constructed as a unitary apart via a combination of electrical discharge machining (EDM) and computer numerical control (CNC) machining.

Step 4002 then comprises positioning an inner group of links each defining a pivoting aperture within which a pivot shaft may rotate and a sliding aperture within which another pivot shaft can both rotate and translate laterally on the plurality of pivot shafts. In one or more embodiments, this results in odd instances of the plurality of pivot shafts each engaging pivoting aperture of the inner group of links and even instances of the plurality of pivot shafts each engaging sliding apertures of the inner group of links.

Step 4003 comprises positioning an outer group of links defining another pivoting aperture within which each pivot shaft engaging the other pivoting aperture can rotate and another sliding aperture within which other pivot shafts engaging the other pivoting aperture can both translate laterally and rotate. In one or more embodiments, this results in even instances of the plurality of pivot shafts each engaging pivoting aperture of the outer group of links and odd instances of the plurality of pivot shafts each engaging sliding aperture of the outer group of links. Steps 4002, 4003 thus result in an interleaved, alternating engagement where each pivot shaft engages one of a pivoting aperture or a sliding aperture of the inner group of links and another of a pivoting aperture or a sliding aperture in the outer group of links. A pivot shaft first engaging a pivoting aperture would thereafter engage a sliding aperture as it extends distally from the stanchion, and vice versa. In one or more embodiments, step 4004 also comprises attaching fasteners to each pivot shaft of the plurality of pivot shafts to retain the inner group of links and the outer group of links engaged around the pivot shaft.

Step 4004 then comprises coupling electronic circuit components to the flexible substrate. In one or more embodiments, the electronic circuit components are coupled to the flexible substrate on the same side as the stanchions and links, with the stanchions and their corresponding pivot shafts engaging the inner group of links and the outer group of links separating instances of the electronic circuit components. Step 4005 can then comprise attaching a flexible display to the flexible substrate. In one or more embodiments, this step 4005 positions the flexible display on the opposite side of the flexible substrate from the pivot shafts and links.

Step 4006 can comprise positioning rechargeable batteries between each pair of stanchions while step 4005 couples the rechargeable batteries to the electronic circuit components and flexible display using one or more flexible conductors. In other embodiments, one row of stanchions and links can be employed along the centerline of the device, with batteries and/or other electronics positioned to the right and left along either side of the center row of stanchions and links. Step 4007 can then comprise placing a plurality of covers atop the one or more rechargeable batteries such that each cover of the plurality of covers is positioned between each pair of stanchions. As previously noted, the covers could conceivable be combined into one flexible cover, most probably constructed of a combination of rigid and flexible materials.

When the method 4000 is complete, in one or more embodiments pairs of stanchions support pairs of pivot shafts of the plurality of pivot shafts and extend distally from a corresponding bracket of a plurality of brackets that abut the rear major surface of the flexible substrate. One or more rechargeable batteries are situated between pairs of stanchions atop corresponding brackets. A flexible display abuts a front major surface of the flexible substrate on an opposite side of the flexible substrate relative to the deformable link assembly.

One or more embodiments electronic circuit components are electrically coupled between the one or more rechargeable batteries and the flexible display. The electronic circuit components can be electrically coupled together by conductors or a bus passing along the one or more rechargeable batteries. The conductors can comprise a flexible substrate spanning the deformable link assembly to electrically couple the electronic circuit components situated in the electronic circuit component housing to other electronic circuit components situated within another electronic circuit component housing.

In one or more embodiments, the links provide one or more different mechanical functions for the assembled deformable electronic device. Illustrating by example, the links can provide mechanical support for the deformable electronic device when the deformable electronic device is planar in the open position. When the deformable electronic device deforms, the links move together to provide full support for the underside surface of the flexible substrate.

In one or more embodiments, links can be configured to provide one or more optional mechanical functions as well. For example, in one embodiment, the links include protuberances that provide a stop stage that operates to retain the deformable electronic device in a planar geometric configuration. If the amount of force required to deform the deformable electronic device is, for example, five Newtons ordinarily, the inclusion of a protuberances in the links may require a greater amount of force, such as eleven Newtons, to bend the deformable electronic device from the open position.

In one or more embodiments, the links are not only operable to facilitate bending of the deformable electronic device but also to ensure consistency of deformation across the major dimension of the deformable electronic device. Accordingly, in one or more embodiments the links are configured to separate when the deformable electronic device is in the axially displaced open position but move together when the deformable electronic device is in a deformed condition.

Figure 41:
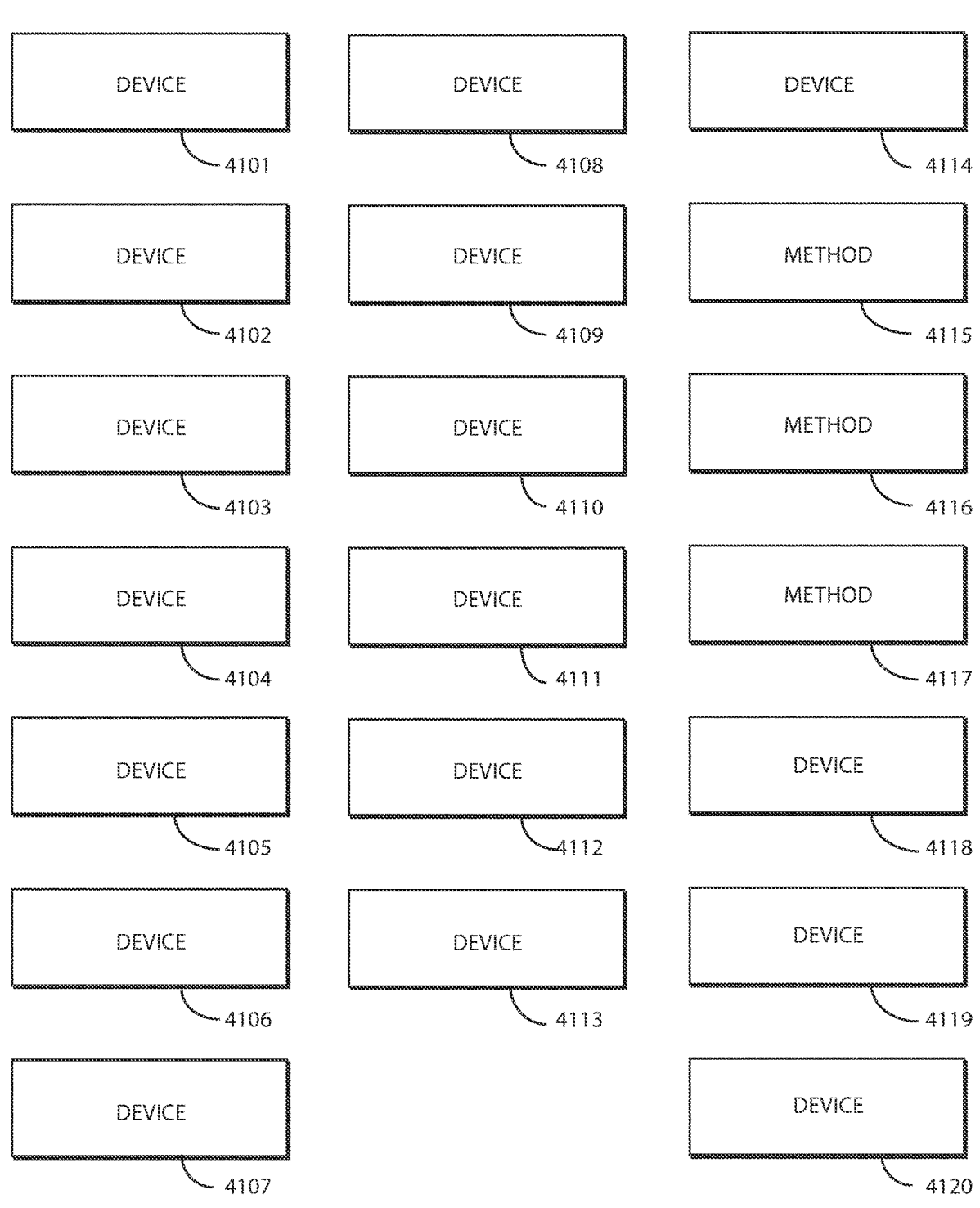
FIG. 41 illustrates one or more embodiments of the disclosure.

Turning now to FIG. 41, illustrated therein are various embodiments of the disclosure. The embodiments of FIG. 41 are shown as labeled boxes in FIG. 41 due to the fact that the individual components of these embodiments have been illustrated in detail in FIGS. 1-40, which precede FIG. 41. Accordingly, since these items have previously been illustrated and described, their repeated illustration is no longer essential for a proper understanding of these embodiments. Thus, the embodiments are shown as labeled boxes.

Beginning at 4101, a deformable electronic device comprises a flexible substrate supporting a plurality of pivot shafts each having its central axis aligned substantially parallel with a surface defined by the flexible substrate. At 4101, the deformable electronic device comprises a plurality of links interconnecting the plurality of pivot shafts.

At 4101, each link of the plurality of links includes a pivoting aperture within which a pivot shaft of the plurality of pivot shafts can rotate without translation and a sliding aperture within which another pivot shaft of the plurality of pivot shafts can both rotate and translate. At 4101, each pivot shaft of the plurality of pivot shafts engages the pivoting aperture of a link of the plurality of links and the sliding aperture of another link of the plurality of links. At 4101, each pivot shaft of the plurality of pivot shafts translates linearly from a first position within the sliding aperture of the other link to a second position within the sliding aperture that is different from the first position when the deformable electronic device deforms from a substantially planar state to a deformed state. In another embodiment, such as indicated in FIG. 35 above, if the housing sections are wide enough, an implementation can be provided where each pivot shaft engages only one link.

At 4102, the first position within the sliding aperture of 4101 is farther from the pivoting aperture than the second position within the sliding aperture. At 4103, the sliding aperture of 4102 defines a curvilinear slot within which each pivot shaft can both rotate and translate when the deformable electronic device deforms.

At 4014, the curvilinear slot of 4103 defines two partially circular edge portions separated by a protuberance. At 4105, each partially circular edge portion of 4104 retains each pivot shaft therein until a lateral force sufficient to cause each pivot shaft to traverse the protuberance is applied to each pivot shaft toward a portion of the curvilinear slot unoccupied by each pivot shaft.

At 4106, each link of the plurality of links of 4102 defines a compression slot causing the pivoting aperture to apply a loading force against each pivot shaft of the plurality of pivot shafts, thereby increasing friction between the pivoting aperture and each link of the plurality of links. At 4107, each link of the plurality of links of 4101 comprises a laminate of a plurality of link layers. At 4108, each pivot shaft of the plurality of pivot shafts of 4101 is supported by a corresponding stanchion extending distally from the flexible substrate.

At 4109, odd instances of each pivot shaft of the plurality of pivot shafts of 4108 engages the pivoting aperture of a link of the plurality of links before the sliding aperture of another link of the plurality of links as they extend distally from their corresponding stanchions. At 4109, even instances of each pivot shaft of the plurality of pivot shafts of 4108 engage the sliding aperture of another link of the plurality of links before the pivoting aperture of the link of the plurality of links as they extend distally from their corresponding stanchions.

At 4110, the deformable electronic device of 4109 further comprises a plurality of screws. At 4110, each pivot shaft defines a threaded bore receiving a screw of the plurality of screws to retain the link and the other link engaged around each pivot shaft of the plurality of pivot shafts. While screws are used in one embodiment, in other embodiments the screws can be replaced with another type of fastener other than a screw such as a shaft with a groove and an e-clip retainer. At 4111, pairs of stanchions of 4109 support pairs of pivot shafts of the plurality of pivot shafts and extend distally from a corresponding bracket of a plurality of brackets abutting the flexible substrate, further comprising one or more rechargeable batteries situated between the pairs of stanchions atop the corresponding bracket.

At 4112, the deformable electronic device of 4111 further comprises a flexible display abutting a major surface of the flexible substrate on an opposite side of the flexible substrate relative to the plurality of brackets. At 4113, the deformable electronic device of 4112 further comprises one or more electronic circuit components electrically coupled between the one or more rechargeable batteries and the flexible display.

At 4114, the deformable electronic device of 4113 further comprises a plurality of covers. At 4114, each cover of the plurality of covers the one or more rechargeable batteries situated between the pairs of stanchions atop the corresponding bracket without touching a neighboring cover when the deformable electronic device is in the substantially planar state.

At 4115, a method of constructing a deformable electronic device comprises attaching a plurality of stanchions supporting a plurality of pivot shafts extending distally therefrom to a first major surface of a flexible substrate. At 4115, the method comprises positioning an inner group of links each defining a pivoting aperture within which a pivot shaft may rotate and a sliding aperture within which another pivot shaft can both rotate and translate laterally on the plurality of pivot shafts such that odd instances of the plurality of pivot shafts each engage pivoting apertures of the inner group of links and even instances of the plurality of pivot shafts each engage sliding apertures of the inner group of links.

At 4115, the method comprises positioning an outer group of links each defining another pivoting aperture within which the pivot shaft may rotate and another sliding aperture within which the another pivot shaft can both rotate and translate laterally on the plurality of pivot shafts such that even instances of the plurality of pivot shafts each engage other pivoting apertures of the outer group of links and odd instances of the plurality of pivot shafts each engage other sliding apertures of the outer group of links. At 4115, the method comprises attaching a flexible display to a second major surface of the flexible substrate.

At 4116, the method of 4115 further comprises positioning one or more rechargeable batteries between pairs of stanchions supporting pairs of pivot shafts having a common central axis. At 4116, the method comprises electrically coupling electronic circuit components between carried by one or more brackets supported by the flexible substrate between the flexible display and the one or more rechargeable batteries.

At 4117, the method of 4116 further comprises attaching fasteners to each pivot shaft of the plurality of pivot shafts to retain the inner group of links and the outer group of links engaged around the plurality of pivot shafts. At 4117, the method comprises placing a plurality of covers atop the one or more rechargeable batteries such that each cover of the plurality of covers is positioned between each pair of stanchions.

At 4118, a deformable electronic device comprises a plurality of pairs of stanchions extending from opposite sides of a flexible substrate. At 4118, each pair of stanchions supporting a pair of pivot shafts.

At 4118, the deformable electronic device comprises an inner group of links each defining a pivoting aperture configured to allow a pivot shaft inserted therein to rotate and a sliding aperture configured to allow another pivot shaft situated therein to both rotate and translate laterally within the sliding aperture with odd instances of pairs of pivot shafts engaging the pivoting aperture and even instances of the pairs of pivot shafts engaging the sliding aperture. At 4118, the deformable electronic device comprises an outer group of links each defining another pivoting aperture configured to allow the pivot shaft inserted therein to rotate and the other pivot shaft to both rotate and translate laterally within the sliding aperture with even instances of the pairs of pivot shafts engaging the other pivoting aperture and odd instances of the pairs of pivot shafts engaging the sliding aperture.

At 4118, the deformable electronic device comprises a pair of rechargeable cells positioned between each pair of stanchions. At 4118, the deformable electronic device comprises electronic circuitry electrically coupled to the pair of rechargeable cells and a flexible display attached to the flexible substrate and electrically coupled to the electronic circuitry.

At 4119, the pivot shafts of 4118 engaging sliding apertures of the inner group of links and the outer group of links translate from a first position within the sliding apertures to a second position within the sliding apertures when the deformable electronic device transitions from a flat configuration to a convex bent configuration. At 4120, each stanchion of 4119 comprises a mechanical stop extending beneath one or more of the inner group of links and/or the outer group of links. At 4120, each stanchion is configured to interfere with links of the one or more of the inner group of links and/or the outer group of links to prevent the flexible display from transitioning to a concave bent configuration.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A deformable electronic device, comprising:

a flexible substrate supporting a plurality of pivot shafts each having its central axis aligned substantially parallel with a surface defined by the flexible substrate; and a plurality of links interconnecting the plurality of pivot shafts, wherein:

each link of the plurality of links includes a pivoting aperture within which a pivot shaft of the plurality of pivot shafts can rotate without translation and a sliding aperture within which another pivot shaft of the plurality of pivot shafts can both rotate and translate;

the another pivot shaft translates linearly from a first position within the sliding aperture to a second position within the sliding aperture that is different from the first position when the deformable electronic device deforms from a substantially planar state to a deformed state;

wherein the first position within the sliding aperture is farther from the pivoting aperture than the second position within the sliding aperture; and the each link of the plurality of links defines a compression slot causing the pivoting aperture to apply a loading force against the pivot shaft, thereby increasing friction between the pivoting aperture and the pivot shaft.

2. The deformable electronic device of claim 1, wherein a diameter of the pivoting aperture is smaller than an outer diameter of the pivot shaft.

3. The deformable electronic device of claim 1, wherein the sliding aperture defines a curvilinear slot within which the pivot shaft can both rotate and translate when the deformable electronic device deforms.

4. The deformable electronic device of claim 3, the curvilinear slot defining two partially circular edge portions separated by a protuberance.

5. The deformable electronic device of claim 4, wherein each partially circular edge portion retains the another pivot shaft in the sliding aperture until a lateral force sufficient to cause the another pivot shaft to traverse the protuberance is applied to the another pivot shaft toward a portion of the curvilinear slot unoccupied by the another pivot shaft.

6. The deformable electronic device of claim 1, wherein the compression slot allows the each link to one or both of expand and/or contract in width.

7. The deformable electronic device of claim 1, wherein the each link of the plurality of links comprises a plurality of link layers.

8. The deformable electronic device of claim 1, wherein each pivot shaft of the plurality of pivot shafts is supported by a corresponding stanchion extending distally from the flexible substrate.

9. The deformable electronic device of claim 8, wherein:

each pivot shaft of the plurality of pivot shafts engages the pivoting aperture of a link of the plurality of links and the sliding aperture of another link of the plurality of links;

odd instances of the each pivot shaft of the plurality of pivot shafts engages the pivoting aperture of a link of the plurality of links before the sliding aperture of another link of the plurality of links as they extend distally from their corresponding stanchions; and even instances of the each pivot shaft of the plurality of pivot shafts engage the sliding aperture of the another link of the plurality of links before the pivoting aperture of the link of the plurality of links as they extend distally from their corresponding stanchions.

10. The deformable electronic device of claim 9, further comprising a plurality of fasteners retaining the link and the another link engaged around the each pivot shaft of the plurality of pivot shafts.

11. The deformable electronic device of claim 9, wherein pairs of stanchions support pairs of pivot shafts of the plurality of pivot shafts and extend distally from a corresponding bracket of a plurality of brackets abutting the flexible substrate, further comprising one or more rechargeable batteries situated between the pairs of stanchions atop the corresponding bracket.

12. The deformable electronic device of claim 11, further comprising a flexible display abutting a major surface of the flexible substrate on an opposite side of the flexible substrate relative to the plurality of brackets.

13. The deformable electronic device of claim 12, further comprising one or more electronic circuit components electrically coupled between the one or more rechargeable batteries and the flexible display.

14. The deformable electronic device of claim 13, further comprising a plurality of covers, with each cover of the plurality of covers covering the one or more rechargeable batteries situated between the pairs of stanchions atop the corresponding bracket without touching a neighboring cover when the deformable electronic device is in the substantially planar state.

15. A method of constructing a deformable electronic device, the method comprising:

attaching a plurality of stanchions supporting a plurality of pivot shafts extending distally therefrom to a first major surface of a flexible substrate;

positioning an inner group of links each defining a pivoting aperture within which a pivot shaft may rotate and a sliding aperture within which another pivot shaft can both rotate and translate laterally on the plurality of pivot shafts such that odd instances of the plurality of pivot shafts each engage pivoting apertures of the inner group of links and even instances of the plurality of pivot shafts each engage sliding apertures of the inner group of links;

positioning an outer group of links each defining another pivoting aperture within which the pivot shaft may rotate and another sliding aperture within which the another pivot shaft can both rotate and translate laterally on the plurality of pivot shafts such that even instances of the plurality of pivot shafts each engage other pivoting apertures of the outer group of links and odd instances of the plurality of pivot shafts each engage other sliding apertures of the outer group of links; and attaching a flexible display to a second major surface of the flexible substrate.

16. The method of claim 15, further comprising:

positioning one or more rechargeable batteries between pairs of stanchions supporting pairs of pivot shafts having a common central axis; and electrically coupling electronic circuit components between carried by one or more brackets supported by the flexible substrate between the flexible display and the one or more rechargeable batteries.

17. The method of claim 16, further comprising:

attaching fasteners to each pivot shaft of the plurality of pivot shafts to retain the inner group of links and the outer group of links engaged around the plurality of pivot shafts; and placing a plurality of covers atop the one or more rechargeable batteries such that each cover of the plurality of covers is positioned between each pair of stanchions.

18. A deformable electronic device, comprising:

a plurality of pairs of stanchions extending from opposite sides of a flexible substrate, with each pair of stanchions supporting a pair of pivot shafts;

an inner group of links each defining a pivoting aperture configured to allow a pivot shaft inserted therein to rotate and a sliding aperture configured to allow another pivot shaft situated therein to both rotate and translate laterally within the sliding aperture with odd instances of pairs of pivot shafts engaging the pivoting aperture and even instances of the pairs of pivot shafts engaging the sliding aperture;

an outer group of links each defining another pivoting aperture configured to allow the pivot shaft inserted therein to rotate and the another pivot shaft to both rotate and translate laterally within the sliding aperture with even instances of the pairs of pivot shafts engaging the another pivoting aperture and odd instances of the pairs of pivot shafts engaging the sliding aperture;

a pair of rechargeable cells positioned between the each pair of stanchions;

electronic circuitry electrically coupled to the pair of rechargeable cells; and a flexible display attached to the flexible substrate and electrically coupled to the electronic circuitry.

19. The deformable electronic device of claim 18, wherein pivot shafts engaging sliding apertures of the inner group of links and the outer group of links translate from a first position within the sliding apertures to a second position within the sliding apertures when the deformable electronic device transitions from a flat configuration to a convex bent configuration.

20. The deformable electronic device of claim 19, wherein each stanchion comprises a mechanical stop extending beneath one or more of the inner group of links and/or the outer group of links configured to interfere with links of the one or more of the inner group of links and/or the outer group of links to prevent the flexible display from transitioning to a concave bent configuration.

21. A deformable electronic device, comprising:

a flexible substrate supporting a plurality of pivot shafts each having its central axis aligned substantially parallel with a surface defined by the flexible substrate; and a plurality of links interconnecting the plurality of pivot shafts, wherein:

each link of the plurality of links includes a pivoting aperture within which a pivot shaft of the plurality of pivot shafts can rotate without translation and a sliding aperture within which another pivot shaft of the plurality of pivot shafts can both rotate and translate;

the another pivot shaft translates linearly from a first position within the sliding aperture to a second position within the sliding aperture that is different from the first position when the deformable electronic device deforms from a substantially planar state to a deformed state; and wherein each pivot shaft of the plurality of pivot shafts is supported by a corresponding stanchion extending distally from the flexible substrate.

* * * * *